US009569347B2

(12) United States Patent
Koju et al.

(10) Patent No.: US 9,569,347 B2
(45) **Date of Patent: *Feb. 14, 2017**

(54) TESTING OPTIMIZED BINARY MODULES

(71) Applicant: International Business Machines Corporation, Armonk, NY (US)

(72) Inventors: Toshihiko Koju, Tokyo (JP); Takuya Nakaike, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/749,049

(22) Filed: Jun. 24, 2015

(65) Prior Publication Data

US 2015/0370695 A1 Dec. 24, 2015

Related U.S. Application Data

(63) Continuation of application No. 14/621,890, filed on Feb. 13, 2015.

(30) Foreign Application Priority Data

Feb. 14, 2014 (JP) ................................ 2014-026911

(51) Int. Cl.

*G06F 9/44* (2006.01)
*G06F 9/45* (2006.01)
*G06F 11/36* (2006.01)

(52) U.S. Cl.

CPC ........... *G06F 11/3692* (2013.01); *G06F 8/443* (2013.01); *G06F 8/52* (2013.01)

(58) Field of Classification Search

CPC ......... G06F 11/3692; G06F 8/443; G06F 8/52

(Continued)

(56) References Cited

U.S. PATENT DOCUMENTS 5,274,811 A * 12/1993 Borg .................. G06F 11/3471 714/E11.203
5,732,210 A * 3/1998 Buzbee .............. G06F 11/3624 714/35

(Continued)

FOREIGN PATENT DOCUMENTS

JP 06236295 8/1994
JP 09288580 11/1997

(Continued)

OTHER PUBLICATIONS

Fahs et al, The Performance Potential of Trace-based Dynamic Optimization, Nov. 2004, Center for Reliable and High Performance Computing, University of Illinois at Urbana-Champaign, Report No. UILU-ENG-04-2208 (CRHC-04-08), Dowloaded Sep. 25, 2015 from <https://www.ideals.illinois.edu/bitstream/handle/2142/74504/B53-CRHC_04_08.pdf>.*

(Continued)

*Primary Examiner* — James D Rutten
(74) *Attorney, Agent, or Firm* — Fleit Gibbons Gutman Bongini Bianco PL; Thomas S. Grzesik

(57) ABSTRACT

Various embodiments test an optimized binary module. In one embodiment, a region in a set of original binary code of an original binary module in which branch coverage is expected to be achieved is selected based on a set of profile information. The region is selected as a target region to be optimized. An optimized binary module is created, where the target region has been optimized in the optimized binary module. The optimized binary module is verified by synchronizing execution of the optimized binary module with execution of the original binary module at a checkpoint while executing both the optimized binary module and the original binary module. The optimized binary module is further verified by comparing an output from executing the (Continued)

optimized binary module to an output from executing the original binary module.

18 Claims, 14 Drawing Sheets

(58) Field of Classification Search
USPC .......................... 717/126, 128, 130, 131, 153
See application file for complete search history.

(56) References Cited

U.S. PATENT DOCUMENTS

| | | | | | |
|---|---|---|---|---|---|
| 5,909,578 | A * | 6/1999 | Buzbee | G06F 11/3466 | 714/E11.2 |
| 5,940,622 | A * | 8/1999 | Patel | G06F 8/443 | 717/158 |
| 6,105,124 | A * | 8/2000 | Farber | G06F 8/445 | 712/208 |
| 6,164,841 | A * | 12/2000 | Mattson, Jr. | G06F 9/45504 | 716/103 |
| 6,223,339 | B1 * | 4/2001 | Shah | G06F 9/44521 | 717/153 |
| 6,405,367 | B1 * | 6/2002 | Bryant | G06F 9/4843 | 717/115 |
| 6,434,738 | B1 * | 8/2002 | Arnow | G06F 8/41 | 709/202 |
| 7,506,318 | B1 * | 3/2009 | Lindo | G06F 11/3644 | 717/130 |
| 2002/0108107 | A1 * | 8/2002 | Darnell | G06F 8/4442 | 717/153 |
| 2002/0170034 | A1 * | 11/2002 | Reeve | G06F 11/3688 | 717/127 |
| 2004/0068727 | A1 * | 4/2004 | Zilles | G06F 8/456 | 718/100 |
| 2004/0268333 | A1 * | 12/2004 | Wang | G06F 8/447 | 717/158 |
| 2005/0055674 | A1 * | 3/2005 | Shidla | G06F 11/263 | 717/131 |
| 2007/0089097 | A1 * | 4/2007 | Hu | G06F 8/443 | 717/132 |
| 2010/0115494 | A1 * | 5/2010 | Gorton, Jr. | G06F 11/3466 | 717/128 |
| 2012/0204164 | A1 * | 8/2012 | Castanos | G06F 8/443 | 717/153 |

FOREIGN PATENT DOCUMENTS

| | | |
|---|---|---|
| JP | 2003526135 | 9/2003 |
| JP | 2004362216 | 12/2004 |
| JP | 2005085277 | 3/2005 |
| JP | 2007518176 | 7/2007 |
| JP | 2008276735 | 11/2008 |
| JP | 2011044078 | 3/2011 |
| JP | 2013504124 | 2/2013 |

OTHER PUBLICATIONS

Glamm, B.; Lilja, D.J., "Automatic verification of instruction set simulation using synchronized state comparison," in Simulation Symposium, 2001. Proceedings. 34th Annual , vol., No., pp. 72-77, 2001 doi: 10.1109/SIMSYM.2001.922117.*

Jiunn-Yeu Chen, Wuu Yang, Bor-Yeh Shen, Yuan-Jia Li, Wei-Chung Hsu, Automatic validation for binary translation, Computer Languages, Systems & Structures, vol. 43, Oct. 2015, pp. 96-115, ISSN 1477-8424, http://dx.doi.org/10.1016/j.cl.2015.05.002.*

Rastislav Bodik, Rajiv Gupta, and Mary Lou Soffa. 1997. Interprocedural conditional branch elimination. In Proceedings of the ACM SIGPLAN 1997 conference on Programming language design and implementation (PLDI '97), A. Michael Berman (Ed.). ACM, New York, NY, USA, 146-158. DOI=http://dx.doi.org/10.1145/258915.258929.*

Christian Häubl, Christian Wimmer, and Hanspeter Mössenböck. 2013. Context-sensitive trace inlining for Java. Comput. Lang. Syst. Struct. 39, 4 (Dec. 2013), 123-141. DOI=http://dx.doi.org/10.1016/j.cl.2013.04.002.*

Shye, A., et al., "PLR: A Software Approach to Transient Fault Tolerance for Multicore Architectures," IEEE Transactions on Dependable and Secure Computing, Oct. 29, 2008, pp. 1-14, vol. 6, No. 12.

Yoshikawa, T., et al., "Random Program Generator for Java JIT Compiler Test System," Proceedings of the Third International Conference on Quality Software, Nov. 6-7, 2003, pp. 1-5.

Non-Final Office Action dated Oct. 9, 2015 received for U.S Appl. No. 14/621,890.

* cited by examiner

411

```
    ENTRY
A:    ...
B:    if ... then
C:      ... // 100 % execution
      else
D:      ... // 0 % execution
E:    ...
      do {
F:      ...
G:      if ... then
H:        ... // 100 % execution
        else
I:        ... // 0 % execution
J:      ...
K:    } while (...)
L:    ...
M:    if ... then
N:      ... // 80 % execution
      else
O:      ... // 20 % execution
P:    ...
    EXIT
```

```
      ENTRY
        do {
A:          ...
B:          str1 = read(file1)
C:          ...
D:          if ... then
E:            ... // 99 % execution
            else
F:            ... // 1 % execution
G:          ...
H:          rc = write(file2, str2)
I:          ...
J:      } while (...)
      EXIT
```

FIG. 5

TESTING OPTIMIZED BINARY MODULES

CROSS-REFERENCE TO RELATED APPLICATION

This application is based upon and claims priority from U.S. patent application Ser. No. 14/621,890 filed on Feb. 13, 2015, which is based upon and claims priority from prior Japanese patent application number 2014-026911, filed on Feb. 14, 2014, the entire contents of both disclosures are hereby incorporated by reference herein.

BACKGROUND

The present disclosure generally relates to a binary module optimizing technique, and more particularly relates to a technique for testing an optimized binary module.

In recent years, binary module optimizing technologies have garnered attention along with the updating and downsizing of hardware. Binary module optimizing technologies are the technologies used to optimize compiled binary modules that are legacy assets (for example, binary modules in COBOL programs) to create binary modules for new machines without having to recompile the source code.

International Business Machines Corporation has released the IBM (registered trademark) COBOL Binary Optimizer from IBM alphaWorks which is software for optimizing binary modules (hereinafter referred to simply as "binary optimization"). The IBM COBOL Binary Optimizer optimizes binary modules in COBOL programs (that is, the original binary modules) without having to recompile the source code by using the new z/Architecture instructions available in systems that execute optimized binary modules.

Patent Literature 1 describes that a program is divided into sections at irrecoverable points such as system calls in the original program to be executed and at thread synchronization points, this process is performed by the compiler, and by dividing a program at a thread synchronization point, execution results from the two threads are guaranteed to be identical provided the program have performed the appropriate synchronization and transient faults have not occurred (paragraph 0010).

Patent Literature 2 describes that a dynamic binary rewriter (DBR) service aggregates samples from a hardware performance monitor, selects regions by estimating the program structure around hot samples, performs modifications (for example, optimization) on the selected regions, and generates replacement code (paragraph 0005).

Patent Literature 3 describes an automated system for generating optimized code from source code provided by a user for use in applications in a certain field on a certain hardware platform including at least one processor (paragraph 0001), which is equipped with an analyzing device enabling the system to create optimization rules from tests using benchmark sequence, static parameters, and dynamic parameters, and performance measurements (paragraph 0030).

Patent Literature 4 describes a program transport supporting program for supporting efficient program transport operations (paragraph 0001), which analyzes programs to be transported using a static analyzer for identifying, by static program analysis, code portions that are not affected by the transport, and a dynamic analyzer for identifying code portions that are not affected by the transport with regard to existing test data Ti regardless of the operating conditions on the basis of information collected using execution traces of the program using the test data. A program converter inserts into the original program a function for collecting runtime information in code portions which may be affected by the transport before tracing the execution of the program (paragraph 0006).

Patent Literature 5 describes a program code converter which is able to reflect, in the destination binary code, optimizations in the source binary code when program code is converted for use by a different processor (paragraph 0008).

Non-Patent Literature 1 describes a software approach to transient fault detection for multicore architectures in which the same program is executed in parallel and synchronized at checkpoints in response to the detection of a transient fault. The output is compared, and redundant execution duplicating the results is used (see "4.10 Transient Fault Recovery" in the right-hand column on page 7).

Non-Patent Literature 2 describes a test system for the Java (registered trademark) JIT Compiler, in which a random test program is generated, and the execution results of the program on reliable Java Runtime are compared to execution results on the program which is compiled by the JIT compiler that is being tested (see the abstract in the left-hand column of page 1).

CITATION LIST

Patent Literature

[Patent Literature 1] Japanese Patent Application Publication No. 2011-44078

[Patent Literature 2] Translation of PCT Application No. 2013-504124

[Patent Literature 3] Translation of PCT Application No. 2007-518176

[Patent Literature 4] Japanese Patent Application Publication No. 6-236295

[Patent Literature 5] Japanese Patent Application Publication No. 2008-276735

Non-Patent Literature

[Non-Patent Literature 1] PLR: A Software Approach to Transient Fault Tolerance for Multicore Architectures, A. Shye et al., IEEE Transactions on Dependable and Secure Computing, vol. 6, no. 2, 2009.

[Non-Patent Literature 2] Random Program Generator for Java JIT Compiler Test System, Yoshikawa et al., Proceedings of the Third International Conference on Quality Software, 2003.

BRIEF SUMMARY

Binary optimization technologies may be used by users to translate large amounts of legacy assets to re-target them to a new machine. However, these users are concerned about the costs of testing required to verify whether or not the optimized binary modules are operating properly. Reducing these costs can be a major factor from a business perspective in deciding whether to migrate to a new machine.

These costs could be reduced if binary optimization and the testing of optimized binary modules were performed automatically in the background and without need for human intervention in the system environment (that is, production environment) in which the optimized binary program is executed.

Therefore, it is an object of the present disclosure to be able to create optimized modules in which the execution results are identical with respect to identical input to the original binary module and the optimized binary module, and to be able to test optimized binary modules by acquiring from the production environment test cases combining inputs and correct outputs from the program while reducing production environment performance as little as possible.

Also, when the optimized binary module includes a side exit (here, "side exit" is a branch which exits from a trace) which transfers control from the optimized binary code in the optimized binary module to the original binary code in the optimized binary module which is copied from the original binary module, execution of the program will fail if the register or memory image is incorrect at the side exit. Therefore, all of the branches in the optimized binary code including side exits have to be covered (that is, branch coverage on the binary code level) when the optimized binary module is tested. Branch coverage is one method used to measure code coverage, and is a technique in which branch coverage is examined for each branching direction at a branch in the binary code.

In the prior art technique for binary optimization, a trace beginning from the target of a back edge (also referred to as backward edge) executed, for example, a fixed number of times is acquired. In this technique, there is a possibility that the branch coverage is significantly reduced when a target region for binary optimization is selected.

FIG. 8 is an example of source code used to more easily explain the process of optimizing a region in the original binary code of the original binary module in which branch coverage is low, and the example corresponds to the original binary code which is a target of the binary optimization. The loop has code for exception processing with a low probability of being executed ((GO TO) (803), and (*error handling*) (813)).

Rows of the source code (801 and 811) are labeled using the reference numbers 01-04 and 01-10 for the sake of convenience.

In the prior art technique, when the original binary code corresponding to the source code (801) shown in FIG. 8 is optimized, the binary code corresponding to the body (802) of the loop is optimized in the source code (801). However, the optimized binary code includes a side exit, that is, code for exception processing with a low probability of being executed (GO TO) (803). This side exit is code used to return from an optimized region in the optimized binary module to an unoptimized original region in the optimized binary module. Consequently, when binary code in the original is optimized using the technique of the prior art, there is a possibility that coverage will be significantly reduced. Therefore, side exits for exception processing with a low probability of being executed are preferably not included as regions to be optimized.

Also, in the prior art technique, when the original binary code corresponding to the source code (811) shown in FIG. 8 is optimized, the binary code corresponding to the body (812) of the loop is optimized in the source code (811). However, the optimized binary code includes a side exit, that is, code for exception processing with a low probability of being executed (*error handling*) (813). Consequently, when the binary code corresponding to the source code (811) is optimized using the technique of the prior art, there is a possibility that coverage will be significantly reduced. Therefore, the binary code corresponding to the latter half (814) of the loop is preferably optimized without including the side exit (813) for exception processing with a low probability of being executed.

The trace in the diagram (901) shown in FIG. 9 is created using the technique of the prior art. The trace in the diagram (901) has four branch instructions, for each of which branch probabilities of branch directions are shown. The branch probabilities are the ones indicated in the profile information of the original binary module. The branch coverage (indicating whether or not a branch in the optimized binary code in the optimized binary module has been executed even once during testing of the optimized binary module) does not become 100% unless branching to each of the destinations of each branch instruction occurs at least once. However, in the trace shown in the diagram (901), the probability of branching to one of the destinations of each of the four branch instructions is 0%. Therefore, the branch coverage of 100% cannot be achieved in the trace shown in diagram (901).

Therefore, it is an object of the present disclosure to ensure that a trace does not include a branch instruction with a low probability branch destination.

The present disclosure provides a technique for testing an optimized binary module. This technique may include a method for testing an optimized binary module, as well as a computer, computer program and computer program product used to obtain information about execution frequencies.

A first aspect of the present disclosure is a method for testing an optimized binary module, which includes the steps, executed by a computer, of: selecting on the basis of profile information, as an optimization target region, a region in original binary code of an original binary module in which branch coverage is expected to be achieved; creating a binary module in which the selected target region has been optimized (hereinafter referred to as "optimized binary module"); and verifying the optimized binary module by synchronizing execution of the optimized binary module with execution of the original binary module at a checkpoint while executing both the optimized binary module and the original binary module, and comparing the output from executing the optimized binary module to the output from executing the original binary module.

In an embodiment of the present disclosure, the profile information may be information obtained by timer sampling or by instrumenting a branch instruction in the original binary module, or information obtained using runtime instrumentation (RI).

In an embodiment of the present disclosure, the method may further include the steps, executed by the computer, of: reducing the selected target region in response to branch coverage not being achieved in the optimized binary code region in the optimized binary module after a predetermined amount of time has elapsed; and re-executing the creating step and the verifying step using the reduced target region.

In an embodiment of the present disclosure, the step of reducing the selected target region may increase the threshold value used to determine whether a branch is to be included in a trace when branch coverage is not achieved in the optimized binary code region in the optimized binary module after the predetermined amount of time has elapsed. The threshold value may be the one for branch probability obtained by dividing the number of times a branch is taken to a branch destination by the total execution count of the branch.

In an embodiment of the present disclosure, the step of selecting a region in which branch coverage is expected to be achieved may include the steps of: detecting a process consuming central processing unit resources of the computer, and an original binary module consuming the central processing unit resources in the process using the profile information; and instrumenting a branch instruction in the detected original binary module and detecting a frequently executed trace which can achieve branch coverage. The computer uses the detected trace as the optimization target region.

In an embodiment of the present disclosure, the step of selecting a region in which branch coverage is expected to be achieved may include the step of combining more than one trace to create a combined region when there is a trace beginning at the branch destination of the detected trace. The computer then uses the combined region as the optimization target region.

In an embodiment of the present disclosure, the step of selecting a region in which branch coverage is expected to be achieved may include the steps of: selecting one or more of conditions (S1) through (S3) below as candidates for the beginning of a trace:

(S1) a branch destination of a back edge, (S2) an exit destination of an existing trace, or (S3) any branch destination of a branch instruction determined to have, in the profile history, a branch destination whose branch probability obtained by dividing the number of times a branch is taken to the branch destination by the total execution count of the branch is lower than a threshold value; incrementing a counter associated with each selected candidate for the beginning of a trace in response to the execution thereof; and establishing, in response to a counter exceeding a threshold value, a trace from the candidate for the beginning of a trace with the counter exceeding the threshold value to the candidate for the end of the trace indicating any of conditions (E1) through (E5) below:

(E1) a branch instruction for the next back edge, (E2) an instruction to branch to the beginning of another trace or a non-branch instruction immediately before an instruction at the beginning of another trace (for example, an instruction that falls through to an instruction at the beginning of another trace), (E3) an instruction immediately before a branch instruction having, in the profile history, a branch destination whose branch probability obtained by dividing the number of times a branch is taken to the branch destination by the total execution count of the branch is lower than a threshold value, (E4) an instruction immediately before a point at which two or more edges converge when the combined region is created by combining more than one trace in response to the fact that there is a trace beginning from the branch destination of the detected trace, or (E5) the end of the program.

In an embodiment of the present disclosure, the profile history may be information obtained by instrumenting a branch instruction in the original binary module, or information obtained by using runtime instrumentation.

In an embodiment of the present disclosure, the optimization target region may be established so as not to include a side exit having a low branch probability.

In an embodiment of the present disclosure, the step of creating the optimized binary module may include the step of: optimizing the checkpoints in the optimized binary module so that the input and output results are identical to those of the original binary module.

In an embodiment of the present disclosure, the step of creating the optimized binary module may include the step of: optimizing the original binary module so that the calls at the checkpoints of the optimized binary module are in the same order as the calls at the same checkpoints in the original binary module.

In an embodiment of the present disclosure, the step of synchronizing the execution of the optimized binary module with the execution of the original binary module at a checkpoint may include the steps of: loading the original binary module into the verification process, and loading the optimized binary module into the test process; and synchronizing the verification process and the test process at the checkpoint.

In an embodiment of the present disclosure, the step of comparing the output from executing the optimized binary module to the output from executing the original binary module may include the step of: comparing the output from the test process to the output from the verification process.

In an embodiment of the present disclosure, the step of verifying the optimized binary module may include the step of: verifying the optimized binary module by comparing the exit code and the exit status of the optimized binary module to the exit code and the exit status of the original binary module, respectively.

In an embodiment of the present disclosure, the method may further include the steps, executed by the computer, of: executing, only in the process of executing the original binary module, the code at a checkpoint in response to successfully executing the optimized binary module as a result of comparing the output from the test process and the output from the verification process; and copying the results of executing in the process of executing the original binary module the code at the checkpoint to the process of executing the optimized binary module.

In an embodiment of the present disclosure, the method may further include the steps, executed by the computer, of: storing all inputs and outputs at all checkpoints in response to the total size of all the inputs and outputs being smaller than a predetermined threshold value; and executing the test of the optimized binary module in a time slot during which the computer load is lower than a predetermined threshold value.

In an embodiment of the present disclosure, the method may further include the steps, executed by the computer, of: executing only in the verification process the code at a checkpoint in response to successfully executing the optimized binary module as a result of comparing the output from the test process and the output from the verification process; and copying the results of the step of executing only in the verification process the code at the checkpoint to the test process.

In an embodiment of the present disclosure, the method may further include the steps, executed by the computer, of: storing in the buffer input to the checkpoint and results from executing the code at the checkpoint in the verification process; and executing the test process in a time slot having a computer load lower than a predetermined threshold value when all of the input to the checkpoint and the execution results have been stored in the buffer.

In an embodiment of the present disclosure, the checkpoint may be a system call or a standard library call. Any system call or standard library call may be used.

A second aspect of the present disclosure is a computer for testing an optimized binary module, which includes: a target region selecting means for selecting on the basis of profile information, as an optimization target region, a region in original binary code of an original binary module in which branch coverage is expected to be achieved; a binary module creating means for creating a binary module in which the selected target region has been optimized (hereinafter referred to as "optimized binary module"); and a verifying means for verifying the optimized binary module by synchronizing execution of the optimized binary module with execution of the original binary module at a checkpoint while executing both the optimized binary module and the original binary module, and comparing the output from executing the optimized binary module to the output from executing the original binary module.

In an embodiment of the present disclosure, the profile information may be information obtained by timer sampling or by instrumenting a branch instruction in the original binary module, or information obtained using runtime instrumentation.

In an embodiment of the present disclosure, the target region selecting means may further include a reducing means for reducing the selected target region when branch coverage is not achieved in the optimized binary code region in the optimized binary module after a predetermined amount of time has elapsed. Also, the optimized binary module creating means may create a binary module in which the reduced target region has been optimized, and the verification means may verify such an optimized binary module in which the reduced target region has been optimized, by synchronizing execution of the optimized binary module with execution of the original binary module at a checkpoint while executing both the optimized binary module and the original binary module, and comparing the output from executing the optimized binary module to the output from executing the original binary module.

In an embodiment of the present disclosure, when the selected target region is reduced, the verification means may increase the threshold value used to determine whether a branch is to be included in a trace when branch coverage is not achieved in the optimized binary code region in the optimized binary module after the predetermined amount of time has elapsed. The threshold value may be the one for branch probability obtained by dividing the number of times a branch is taken to a branch destination by the total execution count of the branch.

In an embodiment of the present disclosure, the target selecting means may: detect a process consuming central processing unit resources of the computer and an original binary module consuming the central processing unit resources in the process using the profile information; and instrument a branch instruction in the detected original binary module and detect a frequently executed trace which can achieve branch coverage. The optimized binary module creating means may then use the detected trace as the optimization target region.

In an embodiment of the present disclosure, the target region selecting means may combine more than one trace to create a combined region when there is a trace beginning at the branch destination of the detected trace. The optimized binary module creating means may then use the combined region as the optimization target region.

In an embodiment of the present disclosure, the target region selecting means may: select one or more of conditions (S1) through (S3) below as candidates for the beginning of a trace:

(S1) a branch destination of a back edge, (S2) an exit destination of an existing trace, or (S3) any branch destination of a branch instruction determined to have, in the profile history, a branch destination whose branch probability obtained by dividing the number of times a branch is taken to a branch destination by the total execution count of the branch is lower than a threshold value;

increment a counter associated with each selected candidate for the beginning of a trace in response to the execution thereof; and establish, in response to a counter exceeding a threshold value, a trace from the candidate for the beginning of a trace with the counter exceeding the threshold value to the candidate for the end of the trace indicating any of conditions (E1) through (E5) below:

(E1) a branch instruction for the next back edge, (E2) an instruction to branch to the beginning of another trace or a non-branch instruction immediately before an instruction at the beginning of another trace (for example, an instruction that falls through to an instruction at the beginning of another trace), (E3) an instruction immediately before a branch instruction having, in the profile history, a branch destination whose branch probability obtained by dividing the number of times a branch is taken to the branch destination by the total execution count of the branch is lower than a threshold value, (E4) an instruction immediately before a point at which two or more edges converge when the combined region is created by combining more than one trace in response to the fact that there is a trace beginning from the branch destination of the detected trace, or (E5) the end of the program.

In an embodiment of the present disclosure, the profile history may be information obtained by instrumenting a branch instruction in the original binary module, or information obtained by using runtime instrumentation.

In an embodiment of the present disclosure, the optimization target region may be established so as not to include a side exit having a low branch probability.

In an embodiment of the present disclosure, the means for creating the optimized binary module may optimize the checkpoints in the optimized binary module so that the input and output results are identical to those of the original binary module.

In an embodiment of the present disclosure, the means for creating the optimized binary module may optimize the original binary module so that the calls at the checkpoints of the optimized binary module are in the same order as the calls at the same checkpoints in the original binary module.

In an embodiment of the present disclosure, when synchronizing the execution of the optimized binary module with the execution of the original binary module at a checkpoint, the verification means may load the original binary module into the verification process and load the optimized binary module into the test process, and synchronize the verification process and the test process at the checkpoint.

In an embodiment of the present disclosure, when comparing the output from executing the optimized binary module to the output from executing the original binary module, the verification means may compare the output from the test process to the output from the verification process.

In an embodiment of the present disclosure, the verification means may verify the optimized binary module by comparing the exit code and the exit status of the optimized binary module to the exit code and the exit status of the original binary module, respectively.

In an embodiment of the present disclosure, the computer may further include: an executing means for executing, only in the process of executing the original binary module, the code at a checkpoint in response to successfully executing the optimized binary module as a result of comparing the output from the test process and the output from the verification process; and a copying means for copying the results of executing in the process of executing the original binary module the code at the checkpoint to the process of executing the optimized binary module.

In an embodiment of the present disclosure, the executing means may store all inputs and outputs at all checkpoints in response to the total size of all the inputs and outputs being smaller than a predetermined threshold value; and execute the test of the optimized binary module in a time slot during which the computer load is lower than a predetermined threshold value.

In an embodiment of the present disclosure, the executing means may execute only in the verification process the code at a checkpoint in response to successfully executing the optimized binary module as a result of comparing the output from the test process and the output from the verification process; and the copying means may copy the results of executing in the verification process the code at the checkpoint to the test process.

In an embodiment of the present disclosure, the computer may include a storage means for storing in the buffer input to the checkpoint and results from executing the code at the checkpoint in the verification process; and the executing means may execute the test process in a time slot having a computer load lower than a predetermined threshold value when all of the input to the checkpoint and the execution results have been stored in the buffer.

In an embodiment of the present disclosure, the checkpoint may be a system call or a standard library call.

A third aspect of the present disclosure is a computer program or computer program product for testing an optimized binary module, in which the computer program or computer program product executes in a computer each step of the method according to the first aspect.

A computer program according to an embodiment of the present disclosure can be stored on any computer-readable recording medium, including a flexible disk, MO, CD-ROM, DVD, BD, hard disk device, USB memory, ROM, MRAM or RAM. The computer program can also be downloaded from another data processing system connected to a communication network for storage on a recording medium, or can be copied from another recording medium. A computer program according to an embodiment of the present disclosure can also be compressed, divided into a plurality of programs, and recorded on one or more recording media. A computer program product according to an embodiment of the present disclosure can take a variety of forms. The computer program product can include, for example, the recording medium on which the computer program is stored or a transmission medium over which the computer program is transmitted.

The summary of the present disclosure provided above is not intended to enumerate all of the required features of the present disclosure, and it is to be understood that the present disclosure includes all combinations and sub-combinations of these constituent elements.

It should also be clear that a person of skill in the art could conceive of various changes such as combining a plurality of machines and allocating functions to these machines to embody hardware elements of the information processing device used in an embodiment of the present disclosure. These changes are encompassed within the concept of the present disclosure. However, these elements are for illustrative purposes only, and all of the elements are not essential elements of the present disclosure.

Also, the present disclosure can be realized by hardware, software, or a combination of hardware and software. When the present disclosure is executed by a combination of hardware and software, it is typically executed by a device in which the computer program has been installed. Here, the computer program is downloaded to the memory of the device and executed. The computer program then controls the device and executes the processing of the present disclosure. This computer program can be configured from groups of instructions expressed in any language, code or notation. The device can execute the specific functions in the group of instructions immediately, or after (1) converting the group of instructions into another language, code or notation, and/or (2) copying the group of instructions to another medium.

The present disclosure is able to operate in the background of the production environment to acquire program test cases combining inputs and correct outputs and is able to automatically perform binary optimization and test optimized binary modules while causing as little deterioration in the performance of the background environment as possible.

The present disclosure selects, as a region to be optimized or optimization target region, a region in original binary code of an original binary module in which branch coverage is expected to be achieved and, therefore, does not include a side exit for exception processing with a low probability of being executed in the optimization target region. As a result, branch coverage of the optimized code in the optimized binary module is improved.

The present disclosure is also able to improve branch coverage in tests and reduce the amount of time required to achieve branch coverage by reducing the region to be optimized in the original binary code of the original binary module. By gradually reducing the size of the region to be optimized, branch coverage can be further improved during testing and the time required to achieve branch coverage can be further reduced. Test case execution can also be reduced so as not to prolong any performance deterioration in the production environment.

The present disclosure is also able to realize a binary optimization system in which a series of operations can be performed transparently in the production environment without requiring manual construction of a testing environment or manual execution of test cases. This series of operations includes optimizing the regions in the original binary module in which branch coverage is expected to be achieved, testing the resulting optimized binary modules, and switching to the optimized binary modules.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2C is a more detailed flowchart of the process performed in Step 2 of the flowchart shown in FIG. 2A according to one embodiment of the present disclosure;

FIG. 4B is an example of source code used to more easily explain the process shown in Step 2 of the flowchart in FIG. 2A, and an example of source code corresponding to the original binary code targeted for binary optimization according to one embodiment of the present disclosure;

FIG. 5 is an example of source code used to more easily explain the process for testing an optimized binary module, and an example of source code corresponding to the original binary code targeted for binary optimization according to one embodiment of the present disclosure;

DETAILED DESCRIPTION

Figure 1:
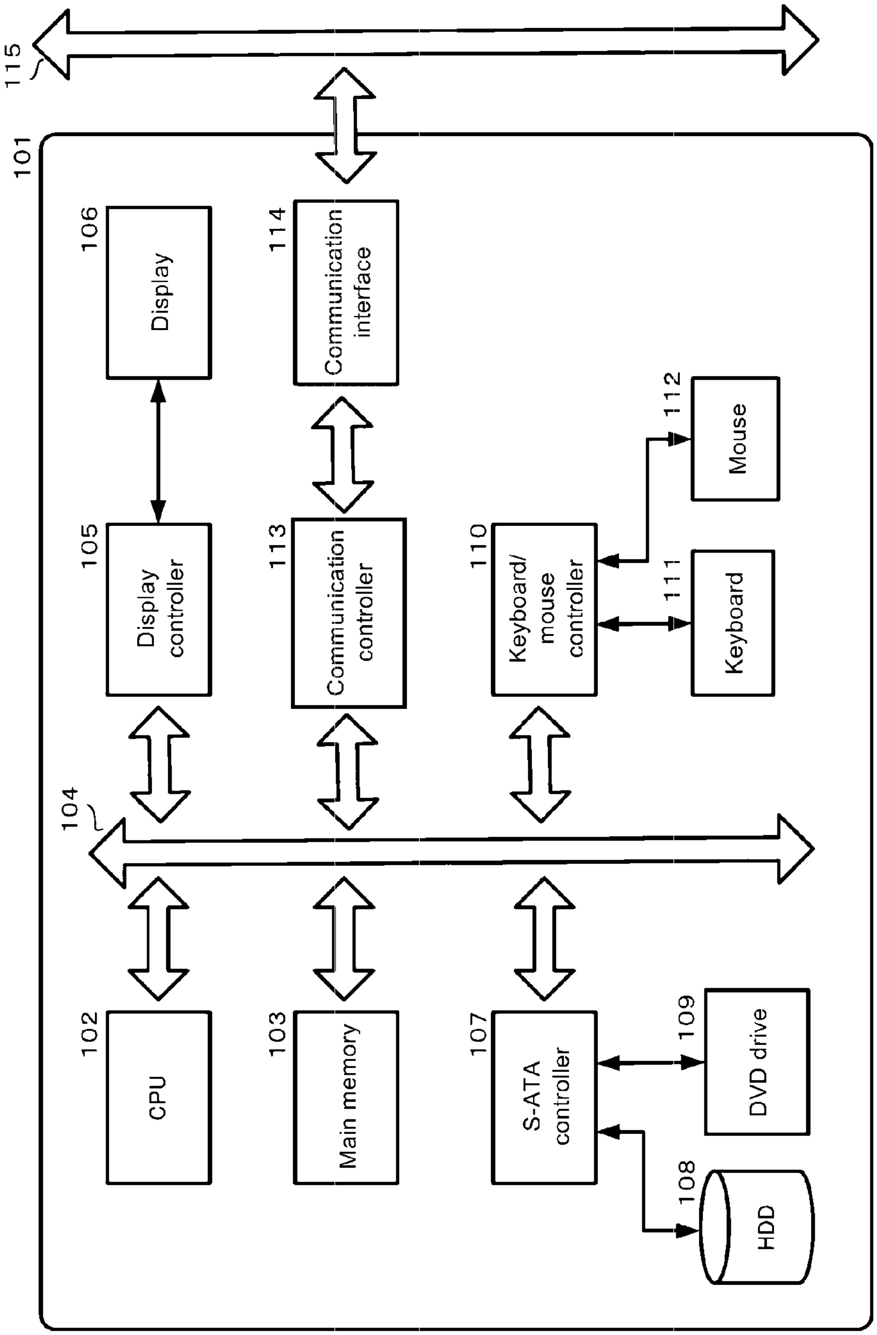
FIG. 1 is a diagram showing an example of a computer according to one embodiment of the present disclosure or usable by one embodiment of the present disclosure.

The following is an explanation of an embodiment of the present disclosure with reference to the drawings. In the drawings described below, the same reference signs are used to denote the same elements unless otherwise noted. It should be understood that the embodiment of the present disclosure is used to explain a preferred embodiment of the present disclosure and that there is no intention to limit the scope of the present disclosure to the embodiment shown herein.

There are no particular restrictions on the computer that can be used in an embodiment of the present disclosure as long as the computer can be used to test an optimized binary module. Examples include main frame computers, server computers, desktop computers, notebook computers, all-in-one personal computers, tablets, and smartphones running on the Windows (registered trademark), Android (registered trademark) or iOS (registered trademark) operating systems.

FIG. 1 is a diagram showing an example of a computer according to an embodiment of the present disclosure or usable by an embodiment of the present disclosure.

This computer (101) includes a central processing unit (CPU) (102) and a main memory (103), and these are connected to a bus (104). The CPU (102) is preferably based on a 32-bit or 64-bit architecture. Examples of CPUs (102) include the Core i (trademark) series, Core 2 (trademark) series, Atom (trademark) series, Xeon (registered trademark) series, Pentium (registered trademark) series or Celeron (registered trademark) series from Intel Corporation, the A Series (trademark), the Phenom (trademark) series, Athlon (trademark) series, Turion (registered trademark) series or Sempron (trademark) from Advanced Micro Devices, or the Power (trademark) series from International Business Machines Corporation.

A display (106) such as a liquid crystal display (LCD) may be connected to the bus (104) via a display controller (105). The liquid crystal display (LCD) may be a touch panel display or a floating touch display. The display (106) may be used to display objects using the appropriate graphics interface by operating software running on the computer (101) (for example, a computer program according to an embodiment of the present disclosure or another type of computer program running on the computer (101). The display (106) may also be used to output the verification results for optimized binary modules. These verification results may indicate whether or not the test process in which the optimized binary module has been loaded ended properly by comparing the exit code (for example, the code returned to the operating system when a process has been completed normally or a specific value indicating the type of error when the process has been completed abnormally) and exit status (a segmentation fault or normal completion status associated with the process) of the test process to the exit code and the exit status of the verification process in which the original binary module had been loaded.

A disk (108), such as a hard disk or solid state drive (SSD), may be connected to the bus (104) via a SATA or IDE controller (107).

A drive (109) such as a CD, DVD or BD drive, may also be connected to the bus (104) via a SATA or IDE controller (107).

A keyboard (111) and mouse (112) may be optionally connected to the bus (104) via a peripheral device controller (110), such as a keyboard/mouse controller, or a USB bus.

Programs, including an operating system such as z/OS (registered trademark), z/VM (registered trademark), z/VSE (registered trademark), z/TPF, VOS3, UNIX (registered trademark), Windows or MacOS (registered trademark), Java (registered trademark) processing environments such as J2EE, Java applications, Java virtual machines (VM), and Java just-in-time (JIT) compilers, as well as a computer program according to the embodiment of the present disclosure, and other programs and data, are stored on the disk (108) for download to the main memory (103).

The disk (108) may be built into the computer (101), connected via cable so as to be accessible to the computer (101), or connected via a wired or wireless network so as to be accessible to the computer (101).

If necessary, a drive (109) may be used to install programs such as the operating system, applications or a computer program according to an embodiment of the present disclosure on the disk (108) from a CD-ROM, DVD-ROM or BD.

The communication interface (114) can use, for example, the Ethernet (registered trademark) protocol. The communication interface (114) is connected to a bus (104) via a communication controller (113), and functions to physically connect the computer (101) to the communication network (115). This provides a network interface layer for the TCP/IP communication protocol in the communication function of the operating system of the computer (101). The communication line can be in a wireless LAN environment based on wireless LAN connection standards, in a Wi-Fi wireless LAN environment such as IEEE 802.11a/b/g/n, or in a mobile phone network environment (for example, a 3G or 4G environment).

FIG. 2A through FIG. 3B are flowcharts of the process in an embodiment of the present disclosure for selecting a region in the original binary module for optimization, creating an optimized binary module in which the selected region has been optimized, and testing the optimized binary module.

Figure 2A:
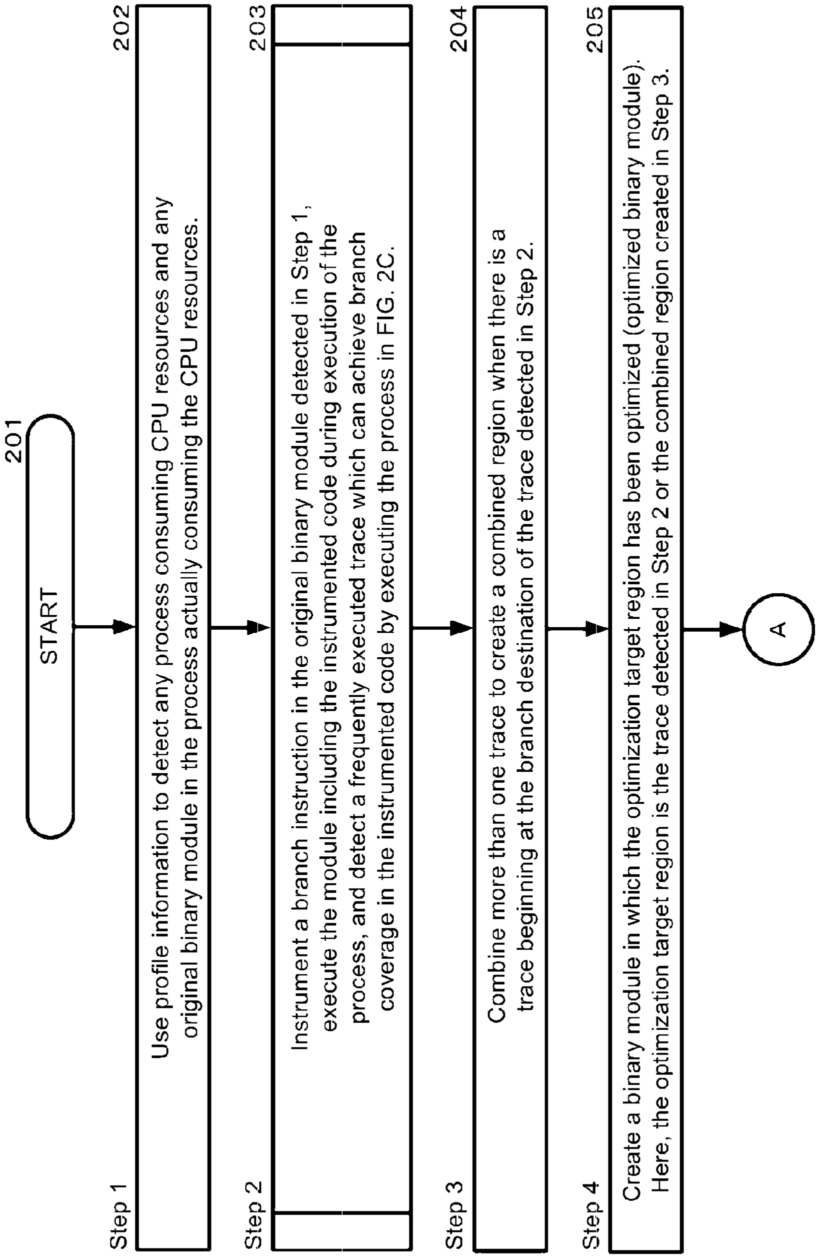
FIG. 2A is a flowchart (Steps 1-4) of the process for testing optimized binary modules according to one embodiment of the present disclosure.
Figure 2B:
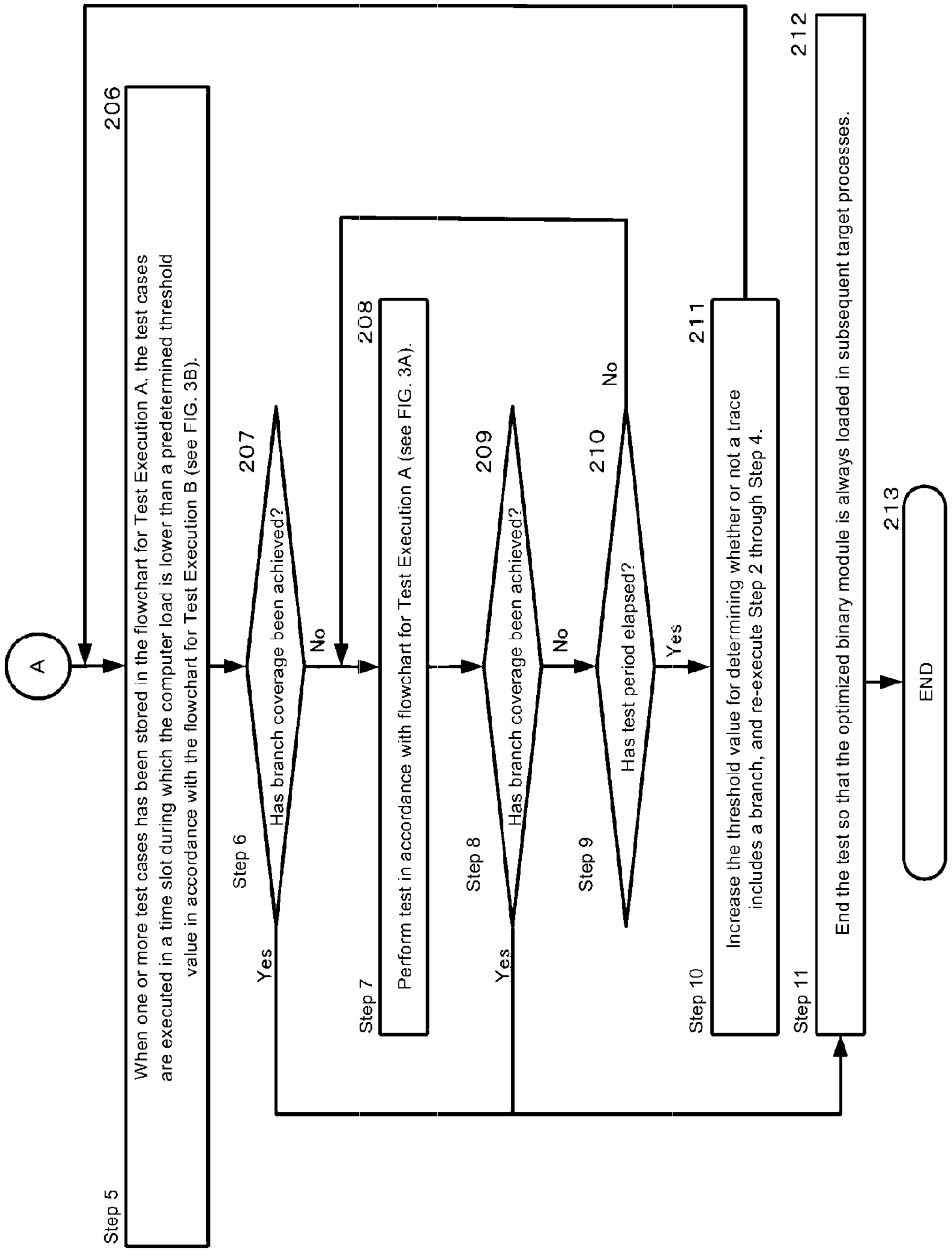
FIG. 2B is a flowchart (Steps 5-11) of the process for testing optimized binary modules according to one embodiment of the present disclosure.

FIG. 2A and FIG. 2B are flowcharts of steps (Steps 1-4 and Steps 5-11) in the process in an embodiment of the present disclosure for selecting a region in the original binary module for optimization, creating an optimized binary module in which the selected region has been optimized, and testing the optimized binary module.

In Step 201, the computer (101) begins the process of selecting a target region in the original binary module to be optimized, creating an optimized binary module in which the target region has been optimized, and testing the optimized binary module.

In Step 202 (Step 1), the computer (101) uses profile information to detect any process consuming central processing unit (CPU) resources and any original binary module in the process actually consuming the CPU resources. Any type of original binary module can be selected as long as a trace can be created from the original binary module and as long as the optimized binary module in which the original binary module has been optimized can be executed by a different process (either a different process on the same computer or a process on a different computer).

The profile information used in Step 1 can be any parameter enabling the detection of a frequently executed process or binary module. For example, the profile information may be a timer sampling. The profile information may also be the system management facilities (SMF) used in System z or runtime instrumentation.

In Step 203 (Step 2), the computer (101) instruments a branch instruction in the original binary module detected in Step 1, executes the module including the instrumented code during execution of the process, and detects a frequently executed trace which can achieve branch coverage in the instrumented code by executing the process in FIG. 2C. High frequency execution is determined using the number of times the trace has been executed in the process. High frequency execution may also be determined by whether or not the counter in Step 2-3 shown in FIG. 2C has exceeded a predetermined threshold value. The detected trace may be the target region for optimization in Step 4. Instrumenting a branch instruction in a binary module entails inserting code to enable profiling. Instrumented code in the binary module acquires profile information (for example, total execution count of each branch instruction and the number of times a branch is taken to each branch destination) and stores the acquired profile information as profiling history while the process shown in FIG. 2C is being executed. The processing in Step 2 is shown in greater detail in FIG. 2C.

The profiling history may be information obtained by instrumenting branch instructions in the original binary module, or information obtained by using runtime instrumentation.

Step 204 (Step 3) is an optional step. In Step 204, the computer (101) combines more than one trace to create a combined region larger than a trace when there is a trace beginning from the branch destination of the trace detected in Step 2. The combined region can be used as the target region to be optimized in Step 4. The effect of optimization is increased when combined regions are created.

In Step 205 (Step 4), the computer (101) creates a binary module in which the optimization target region has been optimized (optimized binary module). Here, the optimization target region is the trace detected in Step 2 or the combined region created in Step 3. The computer (101) may also optimize an original binary module so that the optimized binary module has the same inputs and outputs (execution results) as the original binary module, and so that the code at the checkpoints in the optimized binary module are called in the same order as those in the original binary module. The checkpoints may be calls to the standard library routine or system calls.

Step 206 (Step 5) is an optional step. In Step 206, the computer (101) executes test cases in a time slot during which the computer load is lower than a predetermined threshold value in accordance with the flowchart for Test Execution B in FIG. 3B when one or more test cases has been stored in the flowchart for Test Execution A shown in FIG. 3A. The computer (101) skips Step 5 and Step 6 when no test cases have been stored.

In Step 207 (Step 6), the computer (101) determines whether or not branch coverage has been achieved in the optimized binary code of the optimized binary module. The computer (101) proceeds to Step 208 when branch coverage has not been achieved. When branch coverage has been achieved, the computer (101) proceeds to Step 212.

Figure 3A:
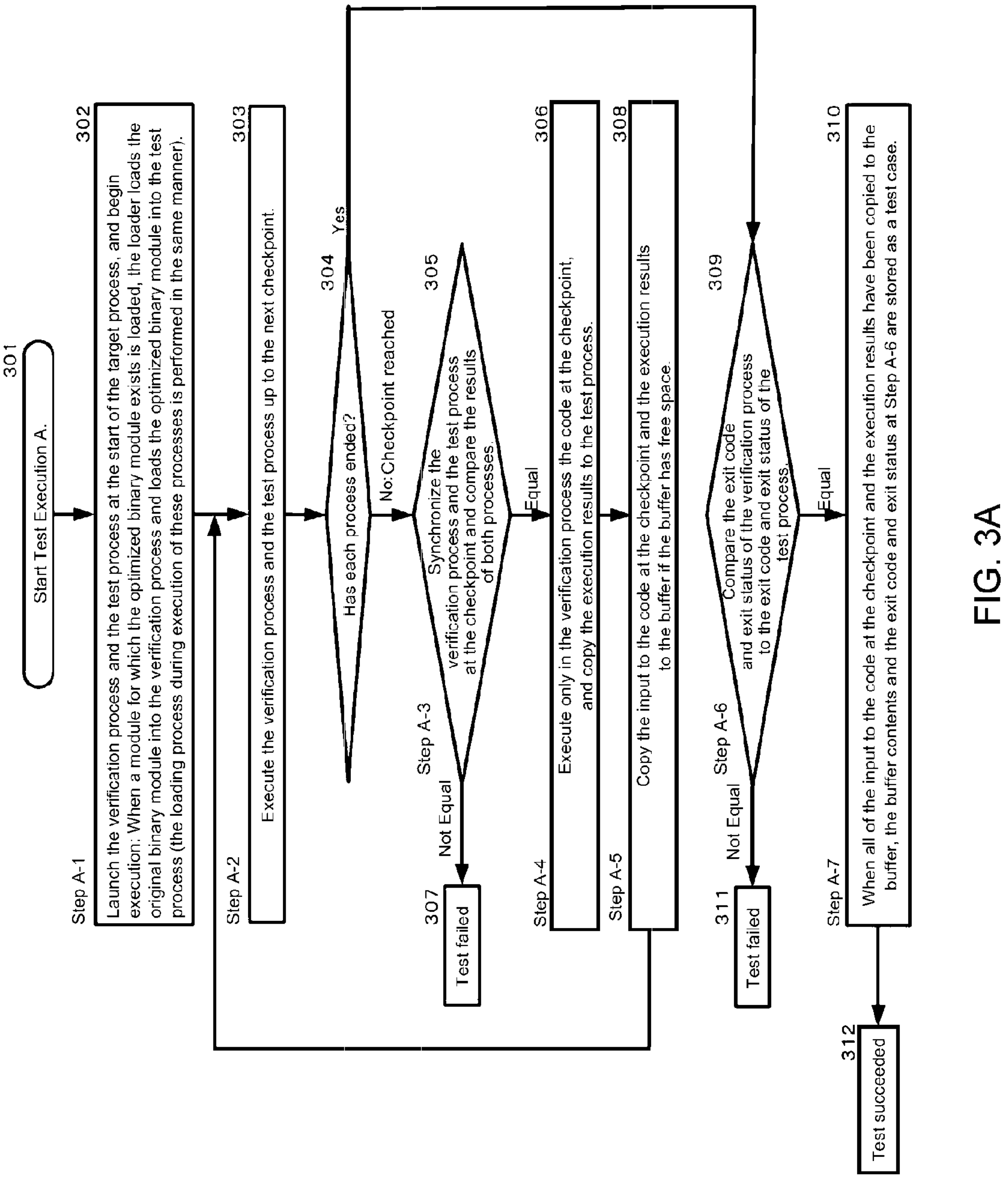
FIG. 3A is a flowchart of the process according to one embodiment of the present disclosure for executing only in the process of executing the original binary module the code at a checkpoint in response to successfully executing the optimized binary module as a result of comparing the output from the test process and the output from the verification process; and copying the results of executing in the process of executing the original binary module the code at the checkpoint to the process of executing the optimized binary module.

In Step 208 (Step 7), the computer (101) performs the test in accordance with the flowchart for Test Execution A in FIG. 3A.

In Step 209 (Step 8), the computer (101) determines whether or not branch coverage has been achieved in the optimized binary code of the optimized binary module. The computer (101) proceeds to Step 210 when branch coverage has not been achieved. When branch coverage has been achieved, the computer (101) proceeds to Step 212.

In Step 210 (Step 9), the computer (101) determines whether or not the test period has elapsed. The test period is the total amount of time required to execute the test. For example, it is the total amount of time required to perform the processing in Step 206 and Step 208 in FIG. 2B. When the total amount of time exceeds a threshold value set by the user, the test period may be considered to have elapsed. The computer (101) proceeds to Step 211 when the test period has elapsed. When the test period has not elapsed, the computer (101) proceeds to Step 208 in order to execute the test again.

In Step 211 (Step 10), the computer (101) increases the threshold value for determining whether or not a trace includes a branch (branch probability threshold value), and re-executes Step 2 through Step 4 in FIG. 2A. The target region to be optimized is reduced by increasing the threshold value of the branch probability. The computer (101) returns to Step 5 when re-execution of Step 2 through Step 4 has ended.

In 212 (Step 11), the computer (101) ends the test so that the optimized binary module is always loaded in target processes after the test has been ended (that is, the process executes the optimized binary module transparently instead of the original binary module).

In Step 213, the computer (101) ends the process of testing optimized binary code.

FIG. 2C is a more detailed flowchart of the process performed in Step 2 of the flowchart shown in FIG. 2A according to an embodiment of the present disclosure. It is also the flowchart of the process performed to detect a trace to be used as a target region to be optimized.

In Step 221, the computer (101) starts the processing in Step 2 (203) of FIG. 2A.

In Step 222 (Step 2-1), on the basis of the profile history (for example, information obtained by timer sampling or by instrumenting a branch instruction in the original binary module, or information obtained by using runtime instrumentation), the computer (101) selects one or more of conditions (S1) through (S3) below as candidates for the beginning of a trace in the original binary module for which branch coverage is expected to be achieved:

(S1) a branch destination of a back edge, (S2) an exit destination of an existing trace, or (S3) any branch destination of a branching instruction determined to have, in the profile history, a branch destination whose branch probability obtained by dividing the number of times a branch is taken to the branch destination by the total execution count of the branch is lower than a threshold value (that is, any branch destination of a branch instruction determined to have a low branch probability in (E3) below).

In Step 223 (Step 2-2), the computer (101) increments (for example, increments by +1) a counter associated with the selected candidate for the beginning of the trace in response to executing the candidate for the beginning of the trace.

In Step 224 (Step 2-3), the computer (101) determines whether or not the counter exceeds a predetermined threshold value. The computer (101) proceeds to Step 225 when the counter exceeds the predetermined threshold value. When the counter does not exceed the predetermined threshold value, the computer (101) proceeds to Step 222 in order to return to the process of selecting a candidate for the beginning of a trace without detecting a candidate for an end of a trace.

In Step 225 (Step 2-4), the computer (101) establishes a trace from the candidate for the beginning of a trace with the counter exceeding the threshold value to the candidate for the end of the trace indicating any of conditions (E1) through (E5) below:

(E1) a branch instruction for the next back edge, (E2) an instruction to branch to the beginning of another trace or a non-branch instruction immediately before an instruction at the beginning of another trace (for example, an instruction that falls through to an instruction at the beginning of another trace), (E3) an instruction immediately before a branch instruction having, in the profile history, a branch destination whose branch probability obtained by dividing the number of times a branch is taken to the branch destination by the total execution count of the branch is lower than a threshold value, (E4) an instruction immediately before a point at which two or more edges converge when the combined region is created by combining more than one trace in response to the fact that there is a trace beginning from the branch destination of the detected trace, or (E5) the end of the program.

The fall through instruction is an instruction other than the branch instruction, and when the instruction is executed, an instruction at the next address is sequentially executed.

In Step 226, the computer (101) determines whether or not Step 2-1 through Step 2-4 are to be repeated. This is performed by determining whether or not the target process is to be ended. For example, the computer (101) uses the code instrumented in Step 2 to execute the process in Step 2-1 through Step 2-4 until the target process is ended. When the process is not to be repeated (that is, the target process is to be ended), the computer (101) proceeds to Step 227. When the process is to be repeated (that is, the target process is not to be ended), the computer (101) proceeds to Step 222.

In Step 227, the computer (101) ends the processing in Step 2 (203).

In the process shown in FIG. 2C, as described above, when the computer (101) detects, during the execution of the target process, that code in which branch instructions of the original binary module are instrumented (hereinafter also referred to as "instrumentation code") satisfies one or more of conditions (S1) through (S3) in Step 2-1, the computer (101) executes the processing in Step 2-2 and Step 2-3 in the instrumentation code. When the counter exceeds the threshold value in Step 2-3, the computer (101) enters a trace recording mode and, while continuing to execute the target process, selects as a trace an instruction sequence that is executed until the instrumentation code detects any one of the conditions (E1) through (E5) shown in Step 2-4.

FIG. 3A is a flowchart of the process according to an embodiment of the present disclosure for executing only in the process of executing the original binary module the code at a checkpoint in response to successfully executing the optimized binary module as a result of comparing the output from the test process and the output from the verification process, and copying the results of executing in the process of executing the original binary module the code at the checkpoint to the process of executing the optimized binary module (hereinafter referred to as "Test Execution A").

In Step 301, the computer (101) begins Test Execution A as the process in Step 7 of FIG. 2B.

In Step 302 (Step A-1), the computer (101) launches the verification process and the test process at the start of the target process, and begins execution of the verification process and the test process. The computer (101) may execute the verification process and the test process in parallel. When the computer (101) loads a module for which the optimized binary module exists, the computer (101) uses a loader (a program which loads a binary module into memory) to load the original binary module into the verification process, and load the optimized binary module into the test process (the loading process during execution of these processes is performed in the same manner). The verification process and the test process may be executed on the same computer (101) or, alternatively, the verification process and the test process may be executed on different computers.

In Step 303 (Step A-2), the computer (101) executes the verification process and the test process up to the next checkpoint. The checkpoint may be a call to a standard library routine or may be a system call.

In Step 304, the computer (101) determines whether or not the verification process and the test process have ended. The computer (101) proceeds to Step 305 when the next checkpoint has been reached and it has determined that the verification process and the test process have not ended. The computer (101) proceeds to Step 309 when the verification process and the test process have ended before reaching the checkpoint.

In Step 305 (Step A-3), the computer (101) synchronizes the verification process and the test process at a checkpoint and compares the output of the verification process to the output of the test process. When the results of the comparison indicate that the output of the verification process and the output of the test process are equal, the computer (101) proceeds to Step 306. When the results of the comparison indicate that the output of the verification process and the output of the test process are not equal, the computer (101) proceeds to Step 307.

In Step 306 (Step A-4), the computer (101) executes only in the verification process the code at the checkpoint, and copies the execution results (that is, the output of the code at the checkpoint) to the test process. The execution results at the checkpoint are binary code input.

In Step 307, because the output of the verification process and the output of the test process are not equal, the computer (101) outputs a result indicating that the optimized binary module in the test process was not correct and that the test failed, and ends Test Execution A.

Step 308 (Step A-5) is an optional step. In Step 308, the computer (101) copies the input to the code at the checkpoint and the execution results to a buffer for test case storage if the buffer has enough free space. The input to the code at the checkpoint is an output of binary code. The size of the buffer is used as the predetermined threshold value for determining whether or not all of the input to the code and the execution results at the checkpoint, along with the exit code and exit status of the verification process are to be stored as a test case for use in the process shown in FIG. 3B.

In Step 309 (Step A-6), the computer (101) compares the exit code and exit status of the verification process to the exit code and exit status of the test process, respectively, in order to determine whether the test process ended properly. The computer (101) proceeds to Step 310 when the exit code and the exit status of the verification process are equal to the exit code and the exit status of the test process, respectively (that is, when the test process has ended properly). The computer (101) proceeds to the error process in Step 311 when at least one of the exit code and the exit status of the verification process and the exit code and the exit status of the test process are not equal (that is, when the test process has not ended properly).

In Step 310 (Step A-7), the buffer contents and the exit code and exit status at Step A-6 are stored as a test case when all of the input to the code at the checkpoint and the execution results have been copied to the buffer. The test case combines the inputs and outputs of the original binary code (or binary module) executed in the production environment.

In Step 311, because at least one of the exit code and exit status of the verification process and the exit code and exit status of the test process are not equal, the computer (101) outputs a result indicating that the optimized binary module in the test process was not correct and that the test failed, and ends Test Execution A.

In Step 312, the computer (101) outputs a result indicating that the optimized binary module in the test process was correct and that the test succeeded, and ends Test Execution A.

Figure 6A:
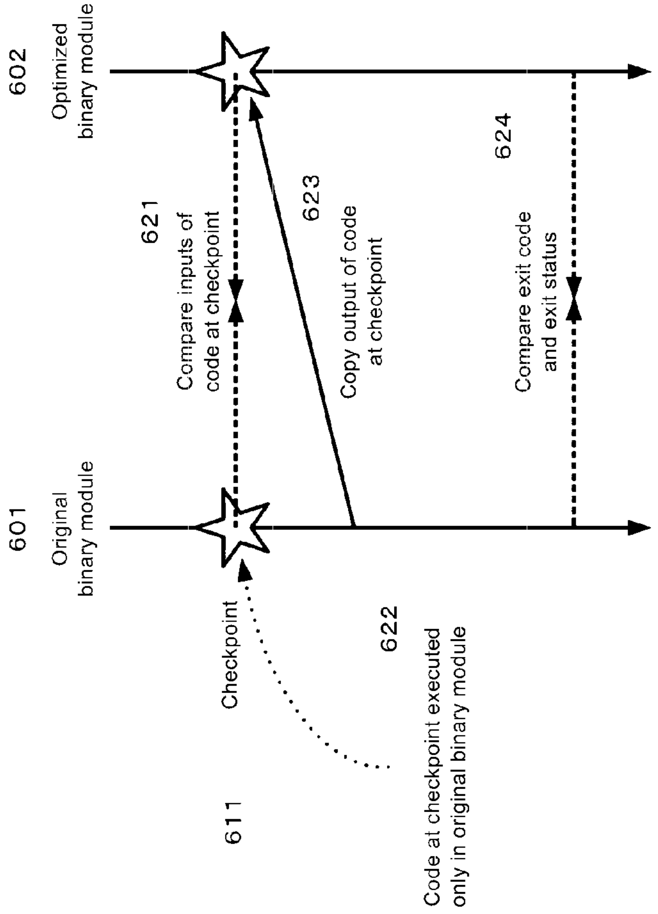
FIG. 6A is a diagram showing the processing performed in Test Execution A shown in FIG. 3A according to one embodiment of the present disclosure.

The following is an explanation of the processing details in FIG. 6A which include even simpler processing for Test Execution A.

Figure 3B:
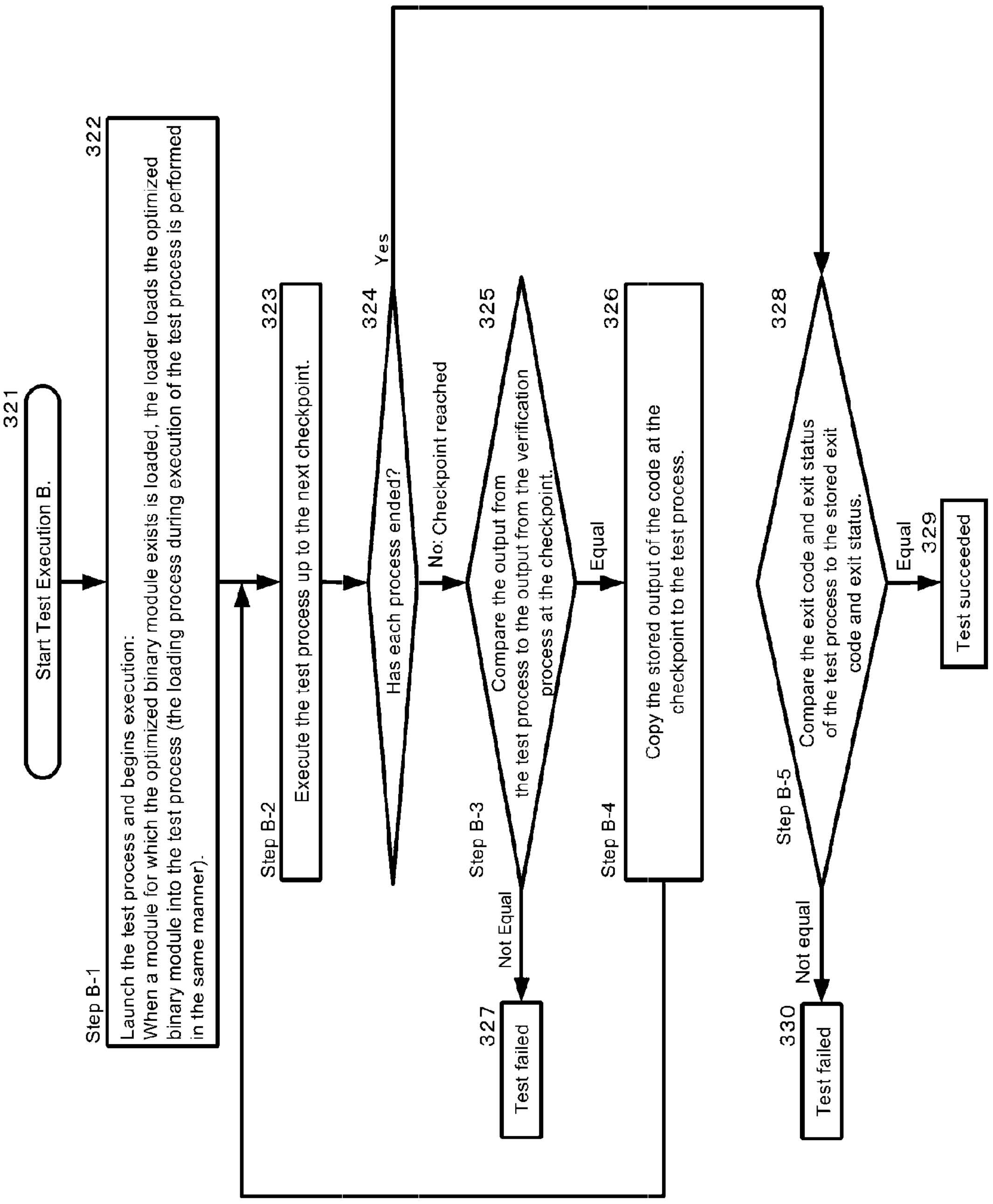
FIG. 3B is a flowchart of the process according to one embodiment of the present disclosure for storing all inputs and outputs at all checkpoints in response to the total size of all the inputs and outputs being smaller than a predetermined threshold value, and executing the test of the optimized binary module in a time slot during which the computer load is lower than a predetermined threshold value.

FIG. 3B is a flowchart of the process according to an embodiment of the present disclosure for storing all inputs and outputs at all checkpoints in Step 310 in response to the total size of all the inputs and outputs being smaller than a predetermined threshold value (when all of the inputs and execution results at the checkpoint have been copied to the buffer in Step 308 in FIG. 3A), and executing the test of the optimized binary module in a time slot during which the computer load is lower than a predetermined threshold value (hereinafter referred to as "Test Execution B").

The user may establish a value, as a threshold value in "the total size of all inputs and outputs at all checkpoints is lower than the predetermined threshold value" (that is, the buffer size in Step 308 shown in FIG. 3A), so that the workload other than the testing is not adversely affected with reference to the free space in the storage device (such as a disk).

[The user may also establish a value, as a threshold value in "time slot during which the computer load is lower than the predetermined threshold value", so that the workload other than the testing is not adversely affected with reference to the availability of the CPU resources.

In Step 321, the computer (101) begins Test Execution B as the process in Step 5 of FIG. 2B.

In Step 322 (Step B-1), the computer (101) launches the test process, and begins execution of the test process. When the computer (101) loads a module for which the optimized binary module exists using a loader, the computer (101) loads the optimized binary module into the test process (the loading process during execution of the test process is performed in the same manner).

In Step 323 (Step B-2), the computer (101) executes the test process up to the next checkpoint. The checkpoint may be a call to a standard reference library routine or may be a system call.

In Step 324, the computer (101) determines whether or not the test process has ended. When the computer (101) has determined at the next checkpoint that the test process has not ended, the process is advanced to Step 325. When the computer (101) has determined that the test process has ended without reaching a checkpoint, the process is advanced to Step 328.

In Step 325 (Step B-3), when a checkpoint is reached, the computer (101) compares the output of the test process to the output of the verification process stored at Step A-7 in FIG. 3A (that is, the input to the code at the checkpoint copied in Step A-5). When the results of the comparison indicate that the output of the test process and the output of the stored verification process are equal, the computer (101) proceeds to Step 325. When the results of the comparison indicate that the output of the test process and the stored output of the verification process are not equal, the computer (101) proceeds to the error processing in Step 327.

In Step 326 (Step B-4), when the output from the test process and the stored output of the verification process are equal, the computer (101) copies the stored output of the code at the checkpoint to the test process (that is, the execution results of the checkpoint copied at Step A-5). When the copying process has ended, the computer (101) returns to Step 323.

In Step 327, because the output of the test process is not equal to the stored output of the verification process, the computer (101) outputs a result indicating that the optimized binary module in the test process is not correct and that the test failed, and ends Test Execution B.

In Step 328 (Step B-6), the computer (101) compares the exit code and exit status of the test process to the exit code and exit status stored in Step A-7, respectively, in order to determine whether the test process ended properly. The computer (101) proceeds to Step 329 when the exit code and the exit status of the test process and the stored exit code and the exit status are equal (that is, when the test process has ended properly). The computer (101) proceeds to the error process in Step 330 when the exit code and the exit status of the test process and the stored exit code and the exit status are not equal (that is, when the test process has not ended properly).

In Step 329, because the exit code and exit status of the test process and the stored exit code and exit status are both equal, the computer (101) outputs a result indicating that the optimized binary module in the test process was correct and that the test succeeded, and ends Test Execution B.

In Step 330, because at least one of the exit code and exit status of the test process and the stored exit code and exit status are not equal, the computer (101) outputs a result indicating that the optimized binary module in the test process was not correct and that the test failed, and ends Test Execution B.

Figure 4A:
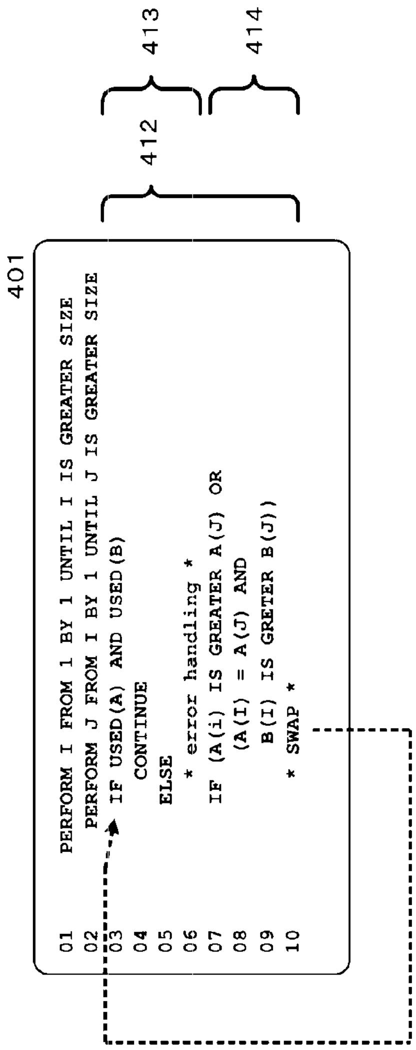
FIG. 4A is an example of source code used to more easily explain the process of selecting, as the target region for optimization, a region in which branch coverage is expected to be achieved in the original binary code of the original binary module, and an example of source code corresponding to the original binary code targeted for binary optimization according to one embodiment of the present disclosure.

FIG. 4A is an example of source code used to more easily explain the process of selecting, as the target region for optimization, a region in which branch coverage is expected to be achieved in the original binary code of the original binary module, and an example of source code corresponding to the original binary code targeted for binary optimization according to an embodiment of the present disclosure.

Figure 8:
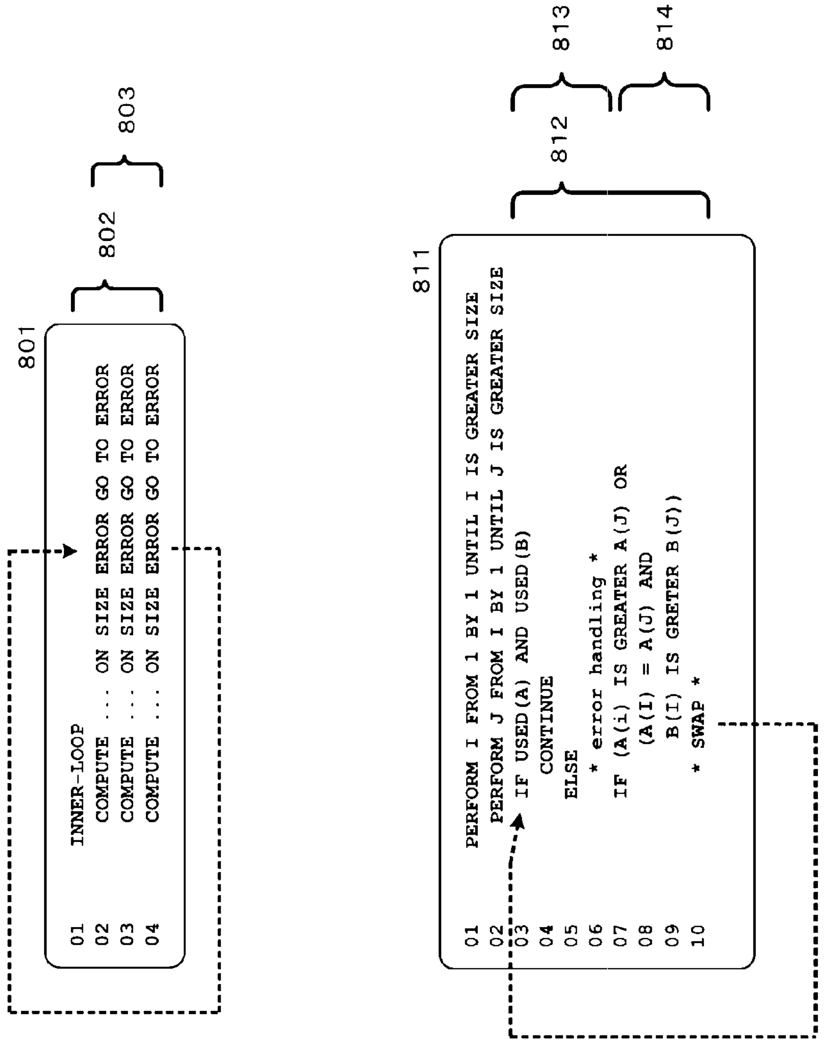
FIG. 8 is an example of source code used to more easily explain the process of optimizing a region in the original binary code of the original binary module in which branch coverage is low, and an example of source code corresponding to the original binary code targeted for binary optimization according to a technique of the prior art.

The source code (401) shown in FIG. 4A is the same source code (811) shown in FIG. 8. The source code (401) corresponding to the original binary code includes code (*error handling*) (413) for exception processing with a low probability of being executed.

In the prior art technique, as mentioned earlier, the optimized binary code includes, as a side exit, code (*error handling*) (813) for exception processing with a low probability of being executed. The side exit, as mentioned earlier, is code for returning from the optimized binary code in the optimized binary module to the unoptimized original binary code.

In Step 2 of FIG. 2A, the present disclosure selects, as the target region for optimization, a region in which branch coverage is expected to be achieved in the original binary code of the original binary module (for example, a region likely to be executed which includes a side exit) on the basis of profile information (such as information obtained by instrumenting a branch instruction in the original binary module, or information obtained by using runtime instrumentation). As a result, the computer (101) optimizes only the binary code corresponding to the latter half (414) of the loop without including in the optimized region the side exit (413) for exception processing which has a low probability of being executed. Thus, when binary optimization is performed in accordance with the present disclosure, branch coverage is improved.

FIG. 4B is an example of source code used to more easily explain the process shown in Step 2 of the flowchart in FIG. 2A, and an example of source code corresponding to the original binary code targeted for binary optimization according to an embodiment of the present disclosure (in other words, the process instruments a branch instruction in the binary module detected in Step 1, executes the module including the instrumented code, and executes the process shown in FIG. 2C using the instrumented code in order to detect frequently executed regions which can achieve branch coverage in the test step).

Line numbers 01 through 22 have been added to the source code (411) corresponding to the original binary code for the sake of convenience, and A through P indicate regions.

In the following explanation, the computer (101) executes Step 2 in the flowchart shown in FIG. 2C with reference to the source code (411) to detect in the original binary code a frequently executed trace which can achieve branch coverage, and then optionally executes Step 3 to create a combined region.

(When Step 2 is executed, and Step 3 is not executed):

1) Regions A-E are excluded from traces because there are no trace starting conditions (S1 through S4).

2) The computer (101) attempts to start the trace from region F according to condition (S1). The computer (101) detects region G and includes up to the instruction immediately before the branch instruction in region G (that is, the instruction in region F) in the trace based on condition (E3).

3) Region G is excluded because of a branch including a low probability branch destination.

4) The computer (101) selects regions H, J and K as a trace according to conditions (S3) and (E1).

5) Region I is excluded from the trace because it has a branch probability of 0% and is not executed.

6) The computer (101), in accordance with condition (S2), starts the trace from region L, selects region M and then region N (with M branching to N when the trace is constructed), and selects for the trace up to the end of the program (that is, region P) in accordance with condition (E5) (that is, regions L, M, N and P).

7) The computer (101), in accordance with conditions (S2) and (E2), selects region O as a trace.

In this way, the computer (101) uses the process in Step 2 (that is, Step 2-1 through Step 2-4) to detect traces {F}, {H, J, K}, {L, M, N, P} and {O} as frequently executed traces which can achieve predetermined branch coverage. The detected traces are used as target regions for optimization in Step 4.

(When Step 2 is executed, and Step 3 is further executed):

1) Regions A-E are excluded from traces because there are no trace starting conditions (S1 through S4).

2) The computer (101) attempts to start the trace from region F according to condition (S1). The computer (101) detects region G and includes up to the instruction immediately before the branch instruction in region G (that is, the instruction in region F) in the trace based on condition (E3).

3) Region G is excluded because of a branch including a low probability branch destination.

4) The computer (101) selects region H as a trace according to conditions (S3) and (E4).

5) The computer (101) selects regions J and K as a trace according to conditions (S2) and (E1).

6) Region I is excluded from the trace because it is not executed.

7) The computer (101), in accordance with condition (S2), starts the trace from region L, selects region M and then region N (with M branching to N when the trace is constructed), and selects for the trace up to region N in accordance with condition (E4).

8) The computer (101), in accordance with conditions (S2) and (E4), selects region O as a trace.

9) The computer (101), in accordance with condition (S2), starts the trace from region P and reaches the end of the program, selecting a trace up to region P in accordance with condition (E5). In this way, the computer (101) uses the process in Step 2 to detect traces {F}, {H}, {J, K}, {L, M, N}, {O} and {P} as frequently executed traces which can achieve predetermined branch coverage.

10) Next, the computer (101) takes traces {F}, {H}, {J, K}, {L, M, N}, {O} and {P} detected in Step 2 and, because a trace begins from the branch destination of another trace, performs the process shown in Step 3 to combine {H}, {J, K} and {F} and to combine {L, M, N}, {O} and {P} in order to create combined region {H, J, K, F} and combined region {L, M, N, O, P}. In this way, the computer (101) uses the process in Step 3 to create combined region {H, J, K, F} and combined region {L, M, N, O, P}. These combined regions are used as target regions for optimization in Step 4.

FIG. 5 is an example of source code used to more easily explain the process for testing an optimized binary module, and an example of source code corresponding to the original binary code targeted for binary optimization according to an embodiment of the present disclosure.

Line numbers 01 through 14 have been added to the source code (501) corresponding to the original binary module (to be optimized) for the sake of convenience, and A through J indicate regions.

In the following explanation, the computer (101) executes the flowcharts in FIG. 2A through FIG. 2C and in FIG. 3A through FIG. 3B, optimizes the original binary code, and tests the optimized binary code.

In Step 2 shown in FIG. 2A, the initial value of the threshold value (branch probability threshold value) used to determine whether a branch is included in a trace is set to 1%.

1) In Step 1, the computer (101) uses profile information to detect any process consuming CPU resources, and uses the process to detect the original binary module that is actually consuming CPU resources. The source code shown in FIG. 5A is used to simplify the explanation of the detected binary module, and is source code corresponding to the detected original binary module.

2) In Step 2, the computer (101) detects traces {A, B, C, D, E} and {G, H, I, J}.

3) In Step 3, the computer (101) detects the presence of a trace beginning from the branch destination of a trace detected in Step 2, and combines the traces detected in Step 2 to create combined region {A, B, C, D, E, G, H, I, J}.

4) In Step 4, the computer (101) selects the combined region created in Step 3 as the target region to be optimized, and creates an optimized binary module in which the target region has been optimized.

5) Because there are not stored test cases yet, the computer (101) skips Step 5 and Step 6, and proceeds to Step 7.

6) The computer (101) starts Step 7. In Step A-1, it launches the verification process and the test process, and begins execution of the verification process and the test process.

7) In Step A-2, the computer (101) executes the verification process and the test process up to the next checkpoint, which is region B.

8) In Step A-3, the computer (101) responds to the verification process and the test process reaching region B, which is the initial checkpoint, by comparing the value of file1 which is the output of the verification process to the value of file1 which is the output of the test process. When the values match, it determines that the test process is operating properly. The instruction in region B is "str1=read (file1)", which is an instruction for reading data from the file indicated by "file1" and sending the data to "str1". Therefore, "file1" is output from the process, and the retrieved data "str1" is input to the process. Here, the value of file1 which is the output of the verification process matches the value of file1 which is the output of the test process.

9) In Step A-4, the computer (101) responds to the proper operation of the test process by executing the code at region B, which is the code at the initial checkpoint, only in the verification process and copies the value of str1, which is the execution result, to the test process.

10) In Step A-5, the computer (101) saves file1 and str1 in the test case storage buffer.

11) The computer (101) responds to Step A-5 ending by returning to Step A-2.

12) In Step A-2, the computer (101) executes the verification process and the test process up to the next checkpoint, which is region H.

13) In Step A-3, the computer (101) responds to the verification process and the test process reaching region H, which is the next checkpoint, by comparing the values of file2 and str2 which are the output of the verification process to the values of file2 and str2 which are the output of the test process, respectively. When the values match, it determines that the test process is operating properly. The instruction in region H is "rc=write (file2, str2)", which is an instruction for writing data "str2" to the file indicated by "file2" and sending the code indicating the result (for example, code indicating success or failure) to "rc". Therefore, "file2" and data "str2" written to "file2" are the output from the process, and the code "rc" indicating the result is input to the process.

14) In Step A-4, the computer (101) executes the code at region H, which is the code at the next checkpoint, only in the verification process and copies the value of rc, which is the execution result, to the test process.

15) In Step A-5, the computer (101) copies file2, str2 and rc to the storage buffer when there is space available in the test case storage buffer.

16) The computer (101) repeats the process in Steps A-2 through A-5 until the verification process and the test process have ended as shown in Step 304.

In the example of the original binary module (501) from Step 6 to Step 16, the branch from region D to region F is not executed, and all of the input to all of the checkpoints and the corresponding execution results are copied to the test case storage buffer.

17) In Step A-6, the computer (101) compares the exit code and the exit status of the verification process to the exit code and the exit status of the test process, respectively, to determine whether or not the test process has ended properly.

18) In Step A-7, when the exit code and the exit status of the verification process are equal to the exit code and the exit status of the test process, respectively, the computer (101) stores the content of the test case storage buffer and the exit code and exit status in Step A-6 as a test case of the current execution process.

19) Because the branch coverage detected in Step 8 is not reached (that is, the branch from region D to region F is not executed) and the test time determined in Step 9 has not been exceeded, Step 7 and Step 8 are repeated.

20) The computer (101) starts Step 7. In Step A-1, it launches the verification process and the test process again, and begins execution of the verification process and the test process.

21) In Step A-2, the computer (101) executes the verification process and the test process up to the next checkpoint, which is region B.

22) In Step A-3, the computer (101) responds to the verification process and the test process reaching region B, which is the initial checkpoint, by comparing the value of file1 which is the output of the verification process to the value of file1 which is the output of the test process. When the values match, it determines that the test process is operating properly. Here, the value of file1 which is the output of the verification process matches the value of file1 which is the output of the test process.

23) In Step A-4, the computer (101) responds to the proper operation of the test process by executing the code at region B, which is the code at the initial checkpoint, only in the verification process and copies the value of str1, which is the execution result, to the test process.

24) In Step A-5, the computer (101) saves file1 and str1 in the test case storage buffer.

25) The computer (101) responds to Step A-5 ending by returning to Step A-2.

26) In Step A-2, the computer (101) executes the verification process and the test process up to the next checkpoint, which is region H.

27) In Step A-3, the computer (101) responds to the verification process and the test process reaching region H, which is the next checkpoint, by comparing the values of file2 and str2 which are the output of the verification process to the value of file2 and str2 which are the output of the test process, respectively. When the values match, it determines that the test process is operating properly.

28) In Step A-4, the computer (101) executes the code at region H, which is the code at the next checkpoint, only in the verification process and copies the value of rc, which is the execution result, to the test process.

29) In Step A-5, the computer (101) copies file2, str2 and rc to the storage buffer when there is space available in the test case storage buffer.

30) The computer (101) repeats the process in Steps A-2 through A-5 until the verification process and the test process have ended as shown in Step 304.

In the example of the original binary module (501) from 18) to 30), the branch from region D to region F is not executed to the end, and all of the input to all of the checkpoints and the corresponding execution results cannot be copied to the test case storage buffer.

31) In Step A-7, the computer (101) does not store the results of the current execution process, that is, the content of the test case storage buffer and the exit code and the exit status in Step A-6 as a test case, because all of the input to all of the checkpoints and the corresponding execution results could not be stored in the test case storage buffer.

32) The computer (101) does not reach the branch coverage detected in Step 8 (that is, the branch from region D to region F is not executed) before the test time determined in Step 9 has been exceeded.

33) In Step 10, the computer (101) raises the threshold value (branch probability threshold value) used to determine whether a branch is to be included in a trace to 10%. Next, the computer (101) executes Step 2 through Step 4 again.

34) In Step 2, the computer (101) detects traces {A, B, C}, {E} and {G, H, I, J}.

35) In Step 3, the computer (101), because a trace begins from the branch destination of another trace detected in Step 2, combines the traces detected in Step 2 to create the combined region {E, G, H, I, J, A, B, C}. The trace beginning from the branch destination of the detected trace {E} is {G, H, I, J}. The trace beginning from the branch destination of the detected trace {G, H, I, J} is {A, B, C}. Because a trace does not begin from the branch destination of trace {A, B, C}, the combined trace is created by the computer (101) in the order {E, G, H, I, J, A, B, C}.

36) In Step 4, the computer (101) selects the combined region created in Step 3 as the target region to be optimized, and creates an optimized binary module in which the target region has been optimized.

37) The computer (101) starts Step 5. In Step B-1, it starts executing the test case stored in 18) (file1, str1, file2, str2, rc, the exit code and the exit status values stored during repetition of the loop). In other words, in Step B-1, the computer (101) launches the test process and begins execution of the stored test case.

38) In Step B-2, the computer (101) executes the test process up to the next checkpoint, which is region B.

39) In Step B-3, the computer (101) responds to the test process reaching region B, which is the initial checkpoint, by comparing the value of file1 which is the output of the test process to the value of file1 stored in 18). When the values match, it determines that the test process is operating properly. Here, the value of file1 which is the output of the verification process matches the value of file1 which is the output of the test process.

40) In Step B-4, str1 stored in Step A-7 in 18) is copied to the test process.

41) The computer (101) responds to the end of Step B-4 by returning to Step B-2.

42) In Step B-2, the computer (101) executes the test process up to region H, which is the next checkpoint.

43) In Step B-3, the computer (101) responds to the test process reaching region H, which is the next checkpoint, by comparing the values of file2 and str2 which are the output of the test process to the values of file2 and str2 stored in Step A-7 in 18), respectively. When the values match, it determines that the test process is operating properly.

44) In Step B-4, the computer (101) copies rc stored in Step A-7 in 18) to the test process.

45) The computer (101) repeats the process in Step B-2 through Step B-4 until the test process ends as shown in Step 324.

46) In Step B-5, the computer (101) compares the exit code and exit status of the test process to the exit code and the exit status stored in Step A-7 in 18), respectively, in order to determine whether or not the test process was ended properly.

47) When the exit code and the exit status of the test process are equal to the exit code and the exit status stored in Step A-7 in 18), respectively, the computer (101) determines that the test of the optimized binary module has been successful.

48) In Step 6, the computer (101) responds to reaching a predetermined branch coverage in the optimized binary module by proceeding to Step 11.

49) In Step 11, the computer (101) ends the test so that the optimized binary module is always loaded in subsequent target processes.

FIG. 6A is a diagram showing the processing performed in Test Execution A shown in FIG. 3A according to an embodiment of the present disclosure.

In Step A-1, the computer (101) launches the verification process and the test process at the start of the target process, and begins execution of the verification process and the test process. The computer begins execution of the verification process and the test process in parallel. The computer (101) loads the original binary module (601) into the verification process, and the optimized binary module (602) into the test process.

In Step A-2, the computer (101) executes the verification process and the test process up to the next checkpoint (611).

In Step A-3, the computer (101) synchronizes the verification process and the test process at the checkpoint (611), and compares the output of the verification process (that is, the input of the code at the checkpoint in the original binary module (601)) to the output of the test process (that is, the input of the code at the checkpoint in the optimized binary module (602)) (621).

In Step A-4, the computer (101) executes only in the verification process the code at the checkpoint when the output of the verification process is equal to the output of the test process (622). Therefore, the code executed at the checkpoint is only that of the original binary module (601). The computer (101) then copies the execution results of the code at the checkpoint in the verification process (in other words, the output of the code at the checkpoint in the verification process) to the test process (623).

Next, the computer (101) executes the verification process and the test process.

In Step A-6, the computer (101) compares the exit code and the exit status of the verification process to the exit code and the exit status of the test process, respectively, to determine whether or not the test process ended properly (624).

Figure 6B:
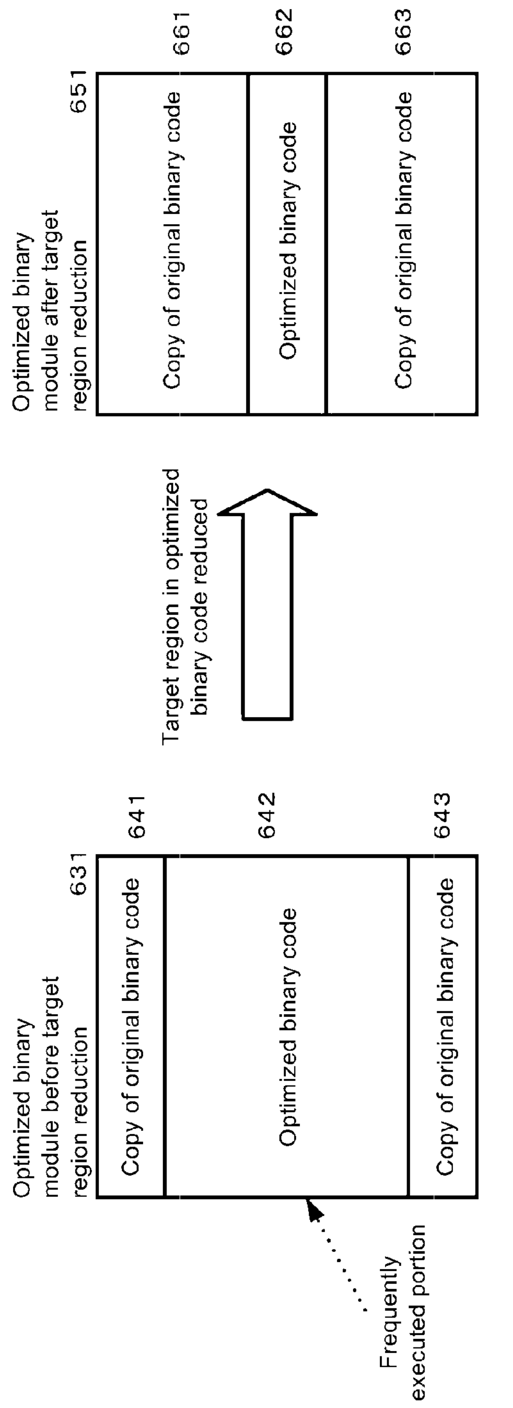
FIG. 6B is a diagram showing the processing performed to reduce the target region in response to branch coverage in the optimized binary code region inside the optimized binary module not having been achieved by the time a predetermined time period has elapsed according to one embodiment of the present disclosure.

FIG. 6B is a diagram showing the processing performed to reduce the target region in response to branch coverage in the optimized binary code region inside the optimized binary module not having been achieved by the time a predetermined time period has elapsed according to the process in Step 10 of FIG. 2B according to an embodiment of the present disclosure.

In an optimized binary module (631) including optimized binary code (642) and copies (641 and 643) of original binary code, the computer (101) reduces the target region for optimization in the original binary module when branch coverage has not been reached in the optimized binary code within a predetermined amount of time. The computer (101) optimizes the reduced target region again, and retests the optimized binary module. Therefore, the optimized binary code (662) in the optimized binary module (651) after the reduction of the target region is reduced compared to the optimized binary code (642) in the optimized binary module (631) before the reduction of the target region, but the copied portions (661, 663) of the original binary code in the optimized binary module (651) after the reduction of the target region is enlarged compared to the copied portions (641, 643) of the original binary code in the optimized binary module (631) before the reduction of the target region.

By reducing the target region for optimization in the original binary module, branch coverage is improved in testing, and the amount of time required to reach branch coverage can be reduced.

The target region for optimization in the original binary module may be repeatedly reduced to realize gradual reduction of the target region for optimization. By gradually reducing the target region for optimization, branch coverage can be further improved during testing and the time required to achieve branch coverage can be further reduced. Test case execution can also be reduced so as not to prolong any performance deterioration in the production environment.

Figure 6C:
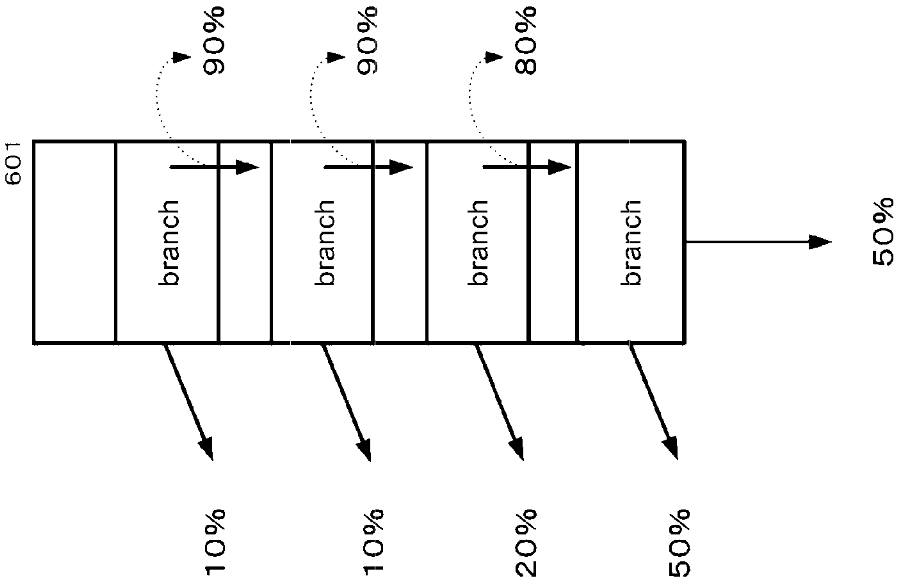
FIG. 6C shows a trace created according to one embodiment of the present disclosure in which a branching instruction with a low probability branch destination is absent from the trace.

FIG. 6C shows a trace created according to an embodiment of the present disclosure in which a branch instruction with a low probability branch destination is absent from the trace.

Figure 9:
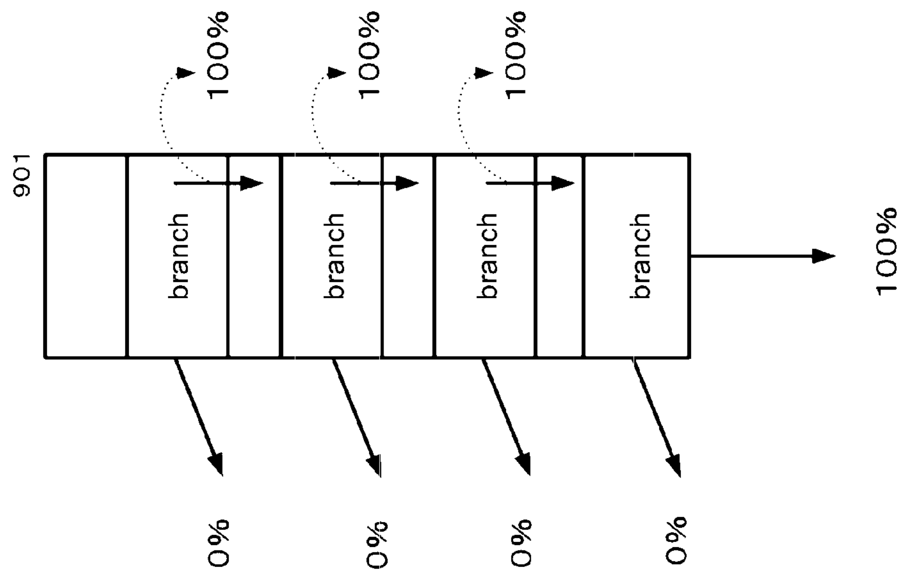
FIG. 9 shows a trace created according to a technique of the prior art in which a branch instruction with a low probability branch destination is included in the trace.

The trace in the diagram (601) shown in FIG. 6C is a trace in which the target region selected for optimization is a region for which branch coverage is expected to be achieved. The trace in the diagram (601) has four branch instructions and the diagram (601) shows the branch probability of each branch destination for each branch instruction. In the trace shown in the diagram (601), the branch probabilities of the branch instructions are 10%, 10%, 20% and 50%, respectively, which are higher than those of the diagram (901) shown in FIG. 9. Therefore, the trace in the diagram (602) has improved branch coverage compared to the trace in diagram (901).

Figure 7:
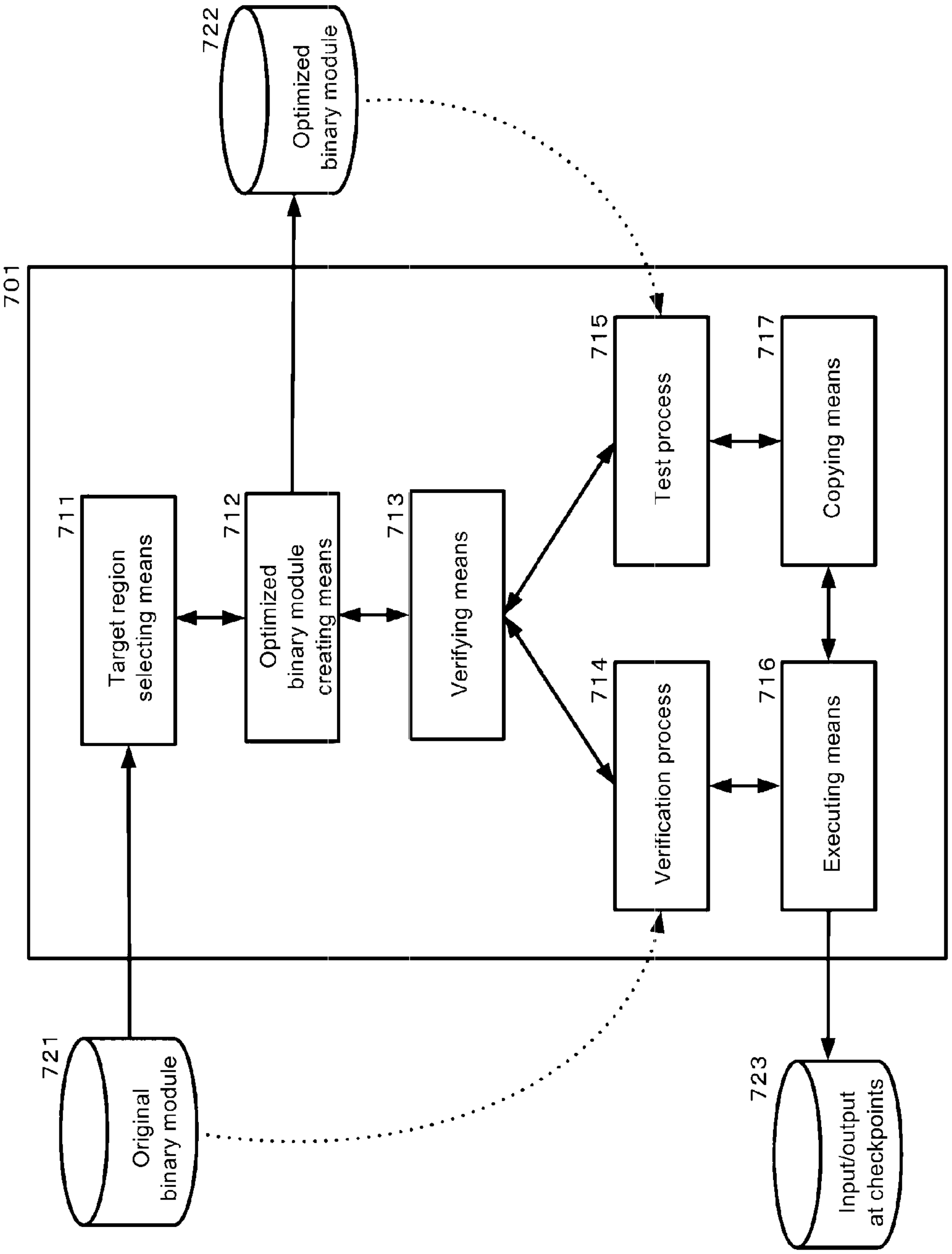
FIG. 7 is a functional block diagram of a computer, preferably including the hardware configuration shown in FIG. 1, used to test an optimized binary module in accordance with one embodiment of the present disclosure.

FIG. 7 is a functional block diagram of a computer, preferably including the hardware configuration shown in FIG. 1, used to test an optimized binary module in accordance with an embodiment of the present disclosure.

The computer (701) is used to test an optimized binary module in an embodiment of the present disclosure, and may be the computer (101) shown in FIG. 1.

The computer (701) includes a target region selecting means (711), an optimized binary module creating means (712), a verifying means (713), and optionally an executing means (716), a copying means (717), and a storage means (723).

The target region selecting means (711) selects, as a target region for optimization, a region in the original binary code (721) in the original binary module (721) in which branch coverage is expected to be achieved, on the basis of the profile history (for example, information obtained by timer sampling or by instrumenting a branch instruction in the original binary module, or information obtained using run-time instrumentation). The original binary module (721) may be stored in a storage device (108, 109) or may be downloaded via a network.

The target region selecting means (711) may select one or more of conditions (S1) through (S3) below as candidates for the beginning of a trace:

(S1) a branch destination of a back edge, (S2) an exit destination of an existing trace, or (S3) any branch destination of a branch instruction determined to have, in the profile history, a branch destination whose branch probability obtained by dividing the number of times a branch is taken to the branch destination by the total execution count of the branch is lower than a threshold value;

increment a counter associated with each selected candidate for the beginning of a trace in response to the execution thereof; and establish, in response to a counter exceeding a threshold value, a trace from the candidate for the beginning of a trace with the counter exceeding the threshold value to the candidate for the end of the trace indicating any of conditions (E1) through (E5) below:

(E1) a branching instruction for the next back edge, (E2) an instruction to branch to the beginning of another trace or a non-branch instruction immediately before an instruction at the beginning of another trace, (E3) an instruction immediately before a branch instruction having, in the profile history, a branch destination whose branch probability obtained by dividing the number of times a branch is taken to the branch destination by the total execution count of the branch is lower than a threshold value, (E4) an instruction immediately before a point at which two or more edges converge when the combined region is created by combining more than one trace in response to the fact that there is a trace beginning from the branch destination of the detected trace, or (E5) the end of the program.

The target region selecting means (711) may establish the optimization target region so as not to include a side exit having a low branch probability.

The target region selecting means (711) may detect, on the basis of profile information (for example, parameters enabling detection of frequently executed processes and binary modules), a process consuming central processing unit resources and an original binary module (721) consuming central processing unit resources in the process, instrument a branch instruction in the detected original binary module, and detect a frequently executed trace which can achieve branch coverage. The detected trace may be used as the optimization target region for the optimized binary module creating means (712).

The target region selecting means (711) may also combine more than one trace to create a combined region when there is a trace beginning from the branch destination of the detected trace. The combined region may be used as the optimization target region for the optimized binary module creating means (712).

The optimized binary module creating means (712) creates an optimized binary module (722) in which the target region selected by the target region selecting means (711) has been optimized. The optimized binary module creating means (712) may store the optimized binary module (722) in a storage device (108, 109), or may upload it to another computer (such as a server) via a network.

The optimized binary module creating means (712) may perform the optimization so that a checkpoint in the optimized binary module (722) has the same input and output results as the original binary module (721).

The optimized binary module creating means (712) may also optimize the original binary module (721) so that the calls at the checkpoints of the optimized binary module (722) are in the same order as the calls at the same checkpoints in the original binary module (721).

The optimized binary module creating means (712) may also compare the output of the test process (715) and the output of the verification process (714) when comparing the output of executing the optimized binary module (722) to the output of executing the original binary module (721).

The verifying means (713) may verify the optimized binary module (722) by synchronizing execution of the optimized binary module (722) with execution of the original binary module (721) at a checkpoint while executing the optimized binary module (722) created by the optimized binary module creating means (712) and the original binary module (721), and comparing the output from executing the optimized binary module (722) to the output from executing the original binary module (721).

When synchronizing execution of the optimized binary module (722) with execution of the original binary module (721) at the checkpoint, the verifying means (712) may load the original binary module (721) into the verification process (714), load the optimized binary module (722) into the test process (715), and synchronize the verification process (714) and the test process (715).

The verifying means (713) may verify the optimized binary module (722) by synchronizing, at the checkpoint, execution of the test process (715) in which the optimized binary module (722) created by the optimized binary module creating means (712) has been loaded with execution of the verification process (714) in which the original binary module (721) has been loaded, while executing the test process (715) and the verification process (714), and comparing output of the test process (715) to output of the verification process (714).

The verifying means (713) may also verify the optimized binary module (722) (that is, verify that the test process (715) has ended properly) by comparing the exit code and exit status of the optimized binary module (722) to the exit code and exit status of the original binary module (721), respectively.

The target region selecting means (711) may include a reducing means (not shown) for reducing the selected target region when a predetermined period of time has elapsed and branch coverage of the optimized binary code region in the optimized binary module (722) created by the optimized binary module creating means (712) has not been achieved.

The optimized binary module creating means (712) may also create an optimized binary module (722) in which a target region reduced by the reducing means has been optimized.

The verifying means (713) may verify the optimized binary module (722) in which the reduced target region has been optimized, by synchronizing execution of the optimized binary module (722) with execution of the original binary module (721) at a checkpoint, and comparing the output from executing the optimized binary module (722) to the output from executing the original binary module (721).

When comparing the output from executing the optimized binary module (722) in which the reduced target region has been optimized to the output from executing the original binary module (721), the verifying means (713) may compare the output of the test process (715) to the output of the verification process (714).

When reducing the selected target region, the verifying means (713) may raise the threshold value (branch probability threshold value) used to determine whether a branch is to be included in a trace if, after a predetermined period of time has elapsed, branch coverage of the optimized binary code in the optimized binary module (722) has not been achieved and the test period has passed.

The verifying means (713) may also verify the optimized binary module (722) by comparing the exit code and exit status of the optimized binary module (722) to the exit code and exit status of the original binary module (721), respectively.

When, as a result of comparing the output of executing the optimized binary module (722) to the output of executing the original binary module (721), the optimized binary module (722) has been executed properly, the executing means (716) may execute the code at the checkpoint only in the process executing the original binary module (721) (that is, the verification process (714)).

The executing means (716) may store all inputs and outputs at all checkpoints in response to the total size of all the inputs and outputs being smaller than a predetermined threshold value.

The executing means (716) may store all inputs and outputs at all checkpoints in response to the total size of all the inputs and outputs being smaller than a predetermined threshold value, and execute the test of the optimized binary module (722) in a time slot during which the computer load is lower than a predetermined threshold value.

When, as a result of comparing the output of executing the test process (715) to the output of executing the verification process (714), the optimized binary module (722) has been executed properly, the executing means (716) may execute the code at the checkpoint only in the verification process (714).

The executing means (716) may store the input to the checkpoint and results from executing the code at the checkpoint only in the verification process (714) in a storage means (723) (for example, a buffer).

The executing means (716) may also execute the test process (715) in a time slot having a computer load lower than a predetermined threshold value when all of the input to the checkpoint and the execution results have been stored in the storage means (723).

The copying means (717) may copy to the process executing the optimized binary module (722) (that is, the test process (715)), results of executing the code at the checkpoint only in the process executing the original binary module (721) (that is, the verification process (714)).

The copying means (717) may copy to the test process (715) the results of executing the code at the checkpoint that was executed only in the verification process (714).

What is claimed is:

1. A method for testing an optimized binary module, the method executable by a computer and comprising:
- selecting, based on a set of profile information, a region in a set of original binary code of an original binary module in which complete branch coverage is to be achieved after optimization of the region, the region being selected as a target region to be optimized;
- creating an optimized binary module, where the target region has been optimized in the optimized binary module, wherein creating the optimized binary module comprises
  - excluding, from the optimized binary module, any branch in the selected region of the original binary code having a probability of being executed that is below a threshold value, and
  - including, within the optimized binary module, a set of side exit branch instructions from the set of original binary code, where each side exit branch instruction in the set of side exit branch instructions transfers control from optimized binary code in the optimized binary module to the set of original binary code, and wherein all side-exit branch instructions in the optimized binary module are to be executed within the optimized binary code; and
- verifying the optimized binary module by synchronizing execution of the optimized binary module with execution of the original binary module at a checkpoint while executing both the optimized binary module and the original binary module, and comparing an output from executing the optimized binary module to an output from executing the original binary module.

2. The method according to claim 1, further comprising:
- reducing the target region based on branch coverage not being achieved in an optimized binary code region in the optimized binary module after a predetermined amount of time has elapsed; and
- re-executing the creating and the verifying using the reduced target region.

3. The method according to claim 2, wherein reducing the selected target region increases a threshold value used to determine whether a branch is to be included in a trace when branch coverage is not achieved in the optimized binary code region in the optimized binary module after a predetermined amount of time has elapsed, and the threshold value is the one for branch probability obtained by dividing the number of times a branch is taken to a branch destination by a total execution count of the branch.

4. The method according to claim 1, the selecting comprises:
- detecting one of a process consuming central processing unit resources of the computer and an original binary module consuming central processing unit resources in the process using the set of profile information;
- instrumenting, based on the detecting, a branch instruction in the one of the process and the original binary module; and
- detecting a frequently executed trace that achieves branch coverage, the detected trace being used as the target region to be optimized.

5. The method according to claim 4, wherein the selecting comprises:
- combining more than one trace to create a combined region when there is a trace beginning at a branch destination of the frequently executed trace, the combined region being used as the target region to be optimized.

6. The method according to claim 4, wherein the selecting comprises:
- selecting one or more of conditions (S1) through (S3) below as candidates for the beginning of a trace:
  - (S1) a branch destination of a back edge,
  - (S2) an exit destination of an existing trace, and
  - (S3) any branch destination of a branch instruction determined to have, in a profile history, a branch destination whose branch probability obtained by dividing a number of times a branch is taken to a branch destination by the total execution count of the branch is lower than a threshold value;
- incrementing a counter associated with each selected candidate for a beginning of a trace in response to the execution thereof; and
- establishing, in response to a counter exceeding a threshold value, a trace from the candidate for a beginning of a trace with the counter exceeding the threshold value to the candidate for an end of the trace indicating at least one of conditions (E1) through (E5) below:
  - (E1) a branch instruction for the next back edge,
  - (E2) an instruction to branch to a beginning of another trace or a non-branch instruction immediately before an instruction at the beginning of another trace,
  - (E3) an instruction immediately before a branch instruction having, in the profile history, a branch destination whose branch probability obtained by dividing a number of times a branch is taken to a branch destination by a total execution count of the branch is lower than a threshold value,
  - (E4) an instruction immediately before a point at which two or more edges converge when the combined region is created by combining more than one trace in response to there being a trace beginning from the branch destination of the detected trace, or
  - (E5) the end of the program.

7. The method according to claim 1, further comprising:
- in response to the output from executing the optimized binary module being equal to the output from executing the original binary module, executing only the set of original binary code at a checkpoint; and copying results of executing only the set of original binary code at the checkpoint to a process for executing the optimized binary module.

8. The method according to claim 1, wherein the verifying comprises:

verifying the optimized binary module by comparing exit code and an exit status of the optimized binary module to exit code and an exit status of the original binary module, respectively.

9. The method according to claim 1, further comprising:

storing all inputs and outputs at all checkpoints in response to a total size of all the inputs and outputs being smaller than a predetermined threshold value; and executing a test of the optimized binary module in a time slot during which a computer load is lower than a predetermined threshold value.

10. The method according to claim 1, wherein creating the optimized binary module comprises:

optimizing a set of checkpoints in the optimized binary module so that the input and output results are identical to those of the original binary module.

11. The method according to claim 1, wherein creating the optimized binary module comprises:

optimizing the original binary module so that a set of calls at a set of checkpoints of the optimized binary module are in a same order as a set of calls at corresponding checkpoints in the original binary module.

12. The method according to claim 1, wherein the target region to be optimized does not include a side exit having a branch probability below a threshold.

13. The method according to claim 1, wherein synchronizing the execution of the optimized binary module with the execution of the original binary module at a checkpoint comprises:

loading the original binary module into a verification process performing the verifying, and loading the optimized binary module into a test process; and synchronizing the verification process and the test process at the checkpoint.

14. The method according to claim 13, wherein comparing the output from executing the optimized binary module to the output from executing the original binary module comprises:

comparing an output from the test process to an output from the verification process.

15. The method according to claim 14, further comprising:

in response to the output from executing the optimized binary module being equal to the output from executing the original binary module, executing only the set of original binary code at a checkpoint only in the verification process; and copying the results of executing the set of original binary code at the checkpoint to the test process.

16. The method according to claim 15, further comprising:

storing, in a buffer input to the checkpoint, the results from executing the code at the checkpoint in the verification process; and executing the test process in a time slot having a computer load lower than a predetermined threshold value when all of the input to the checkpoint and the execution results have been stored in the buffer input.

17. The method according to claim 1, wherein the set of profile information is information obtained by at least one of timer sampling, instrumenting a branch instruction in the original binary module, and information obtained using runtime instrumentation.

18. The method according to claim 1, wherein the checkpoint is one of a system call and a standard library call.

* * * * *